(12) United States Patent
Hisada

(10) Patent No.: US 9,292,775 B2
(45) Date of Patent: Mar. 22, 2016

(54) IMAGE FORMING APPARATUS AND POWER SUPPLY CONTROL METHOD FOR SWITCHING BETWEEN A MAIN POWER SUPPLY AND AN AUXILIARY POWER SUPPLY

(71) Applicant: Masahiko Hisada, Kanagawa (JP)

(72) Inventor: Masahiko Hisada, Kanagawa (JP)

(73) Assignee: RICOH COMPANY, LIMITED, Tokyo (JP)

( * ) Notice: Subject to any disclaimer, the term of this patent is extended or adjusted under 35 U.S.C. 154(b) by 11 days.

(21) Appl. No.: 14/280,785

(22) Filed: May 19, 2014

(65) Prior Publication Data

US 2014/0347685 A1 Nov. 27, 2014

(30) Foreign Application Priority Data

May 24, 2013 (JP) ................................. 2013-110095

(51) Int. Cl.
  *G06F 3/12* (2006.01)
  *G06K 15/00* (2006.01)
  *H04N 1/00* (2006.01)
(52) U.S. Cl.
  CPC ........ *G06K 15/4055* (2013.01); *G06K 15/4045* (2013.01); *H04N 1/00* (2013.01)
(58) Field of Classification Search
  CPC .......... H04N 1/00885; H04N 1/00888; H04N 1/00891; H04N 1/00896; H04N 1/2369; G06F 1/325; G06F 1/3284; G06F 3/1221; G06F 3/1229; G06K 15/4055; G03G 15/5004
  USPC ............... 358/1.1–1.16; 399/37, 88; 713/300, 713/310, 320, 321, 322, 323, 324, 330, 340
  See application file for complete search history.

(56) References Cited

U.S. PATENT DOCUMENTS

| | | | | |
|---|---|---|---|---|
| 5,731,683 A | * | 3/1998 | Nakanishi | ...................... 320/111 |
| 2003/0169309 A1 | * | 9/2003 | Yokoyama | ...................... 347/14 |
| 2005/0286275 A1 | * | 12/2005 | Ryu | ............................... 363/45 |

FOREIGN PATENT DOCUMENTS

| | | | | |
|---|---|---|---|---|
| EP | 0450145 B1 | * | 5/1995 | ................ H02J 7/10 |
| JP | 2004-118343 | | 4/2004 | |
| JP | 2008-233260 | | 10/2008 | |

OTHER PUBLICATIONS

Hewlett-Packard (HP), Power Management User Guide, Aug. 2009, First Edition, pp. 1 and 10.*

* cited by examiner

*Primary Examiner* — Eric A Rust
(74) *Attorney, Agent, or Firm* — Oblon, McClelland, Maier & Neustadt, L.L.P.

(57) ABSTRACT

An image forming apparatus includes a power supply control unit that controls switching a power source to an auxiliary power supply that stores therein power from a main power supply when the main power supply is off, and to the main power supply when the main power supply is on; a detection unit that detects whether the power source is the main or the auxiliary power supply; a communication mode control unit that switches a data transfer rate from a first high-speed mode to a first low-speed mode allowing power consumption lower than the first high-speed mode when the power source is the auxiliary power supply; and a print mode control unit that switches a print speed from a second high-speed mode to a second low-speed mode allowing the power consumption lower than the second high-speed mode when the power source is the auxiliary power supply.

8 Claims, 16 Drawing Sheets

FIG.12

| BATTERY VOLTAGE [V] | BACKLIGHT LUMINANCE [cd/m$^2$] |
|---|---|
| 15.5 AND HIGHER | 2000 |
| 14.8 AND HIGHER TO 15.5 | 1800 |
| 13.8 AND HIGHER TO 14.8 | 1600 |
| 13.2 AND HIGHER TO 13.8 | 1400 |
| 12.6 AND HIGHER TO 13.2 | 1200 |
| LOWER THAN 12.6 | 1000 |

FIG.14

| BATTERY VOLTAGE [V] | DISPLAY OF INFORMATION ON OPERATION/DISPLAY UNIT | |
|---|---|---|
| 15.5 AND HIGHER | DISPLAY INFORMATION | |
| 14.8 AND HIGHER TO 15.5 | DISPLAY INFORMATION WITH BLINKING | 1 [Hz] |
| 13.8 AND HIGHER TO 14.8 | | 0.5 [Hz] |
| 13.2 AND HIGHER TO 13.8 | | 0.33 [Hz] |
| 12.6 AND HIGHER TO 13.2 | | 0.25 [Hz] |
| LOWER THAN 12.6 | | 0.2 [Hz] |

IMAGE FORMING APPARATUS AND POWER SUPPLY CONTROL METHOD FOR SWITCHING BETWEEN A MAIN POWER SUPPLY AND AN AUXILIARY POWER SUPPLY

CROSS-REFERENCE TO RELATED APPLICATION

The present application claims priority to and incorporates by reference the entire contents of Japanese Patent Application No. 2013-110095 filed in Japan on May 24, 2013.

BACKGROUND OF THE INVENTION

1. Field of the Invention

The present invention relates to an image forming apparatus and a power supply control method performed in the image forming apparatus.

2. Description of the Related Art

In recent years, electronic apparatuses such as digital cameras have become common that can be driven not only by supply of power from a commercial power supply outside of an apparatus body via an AC adapter, but also by supply of power from a battery removably installed in the apparatus body.

Some of the battery-drivable electronic apparatuses can switch the data transfer rate between the case of being driven by supply of power from the commercial power supply and the case of being driven by supply of power from the battery. Japanese Laid-open Patent Publication No. 2004-118343 discloses an electronic apparatus that is configured to be capable of switching the data transfer rate to reduce power consumption. The electronic apparatus disclosed in Japanese Laid-open Patent Publication No. 2004-118343 transfers data at a rate in a high-speed mode with higher power consumption when being driven by supply of power from the commercial power supply, and at a rate in a low-speed mode with lower power consumption when being driven by supply of power from the battery.

However, the electronic apparatus disclosed in Japanese Laid-open Patent Publication No. 2004-118343 merely transfers data at the rate in the low-speed mode when being driven by supply of power from the battery, and cannot further reduce the power consumption. This causes a problem in that the duration of the battery cannot be extended.

Therefore, there is a need to provide an image forming apparatus and a power supply control method that are capable of reducing the power consumption when the apparatus is driven by an auxiliary power supply.

SUMMARY OF THE INVENTION

It is an object of the present invention to at least partially solve the problems in the conventional technology.

According to an embodiment, there is provided an image forming apparatus that includes a main power supply; an auxiliary power supply that stores therein power from the main power supply, and that supplies the stored power; a power supply control unit that performs control of switching a power supply source to the auxiliary power supply when the main power supply is off, and control of switching the power supply source to the main power supply when the main power supply is on; a detection unit that detects whether the power supply source is the main power supply or the auxiliary power supply; a communication mode control unit that performs control of switching a data transfer rate from that of a first high-speed mode to that of a first low-speed mode allowing power consumption lower than that of the first high-speed mode when the detection unit detects that the power supply source is the auxiliary power supply; and a print mode control unit that performs control of switching a print speed from that of a second high-speed mode to that of a second low-speed mode allowing the power consumption lower than that of the second high-speed mode when the detection unit detects that the power supply source is the auxiliary power supply.

According to another embodiment, there is provided a power supply control method performed in an image forming apparatus that includes a main power supply, and an auxiliary power supply that stores therein power from the main power supply, and that supplies the stored power. The method includes performing control of switching a power supply source to the auxiliary power supply when the main power supply is off, and control of switching the power supply source to the main power supply when the main power supply is on; detecting whether the power supply source is the main power supply or the auxiliary power supply; performing control of switching a data transfer rate from that of a first high-speed mode to that of a first low-speed mode allowing power consumption lower than that of the first high-speed mode when it is detected that the power supply source is the auxiliary power supply; and performing control of switching a print speed from that of a second high-speed mode to that of a second low-speed mode allowing the power consumption lower than that of the second high-speed mode when it is detected that the power supply source is the auxiliary power supply.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 12 is a diagram explaining a control operation example of the display control unit carried out in the image forming apparatus according to the second embodiment;

FIG. 14 is a diagram explaining a control operation example of the display control unit carried out in the image forming apparatus according to the modification of the second embodiment;

DETAILED DESCRIPTION OF THE PREFERRED EMBODIMENTS

Embodiments of an image forming apparatus and a method of controlling a power supply according to the present invention will be described below in detail with reference to the accompanying drawings. While the embodiments will be described below by exemplifying an inkjet recording device as an example of the image forming apparatus, the present invention is not limited to this, but can be applied to any type of image forming apparatus. The present invention can be applied not only to the inkjet recording device, but also widely to the image forming apparatus that form images by ejecting ink droplets on a recording medium.

The inkjet recording device serving as the image forming apparatus according to the present embodiments has print heads that eject ink of four colors of K, C, M, and Y, and performs image recording by reciprocating the print heads in a direction orthogonal to a conveyance direction of recording paper.

First Embodiment

Figure 1:
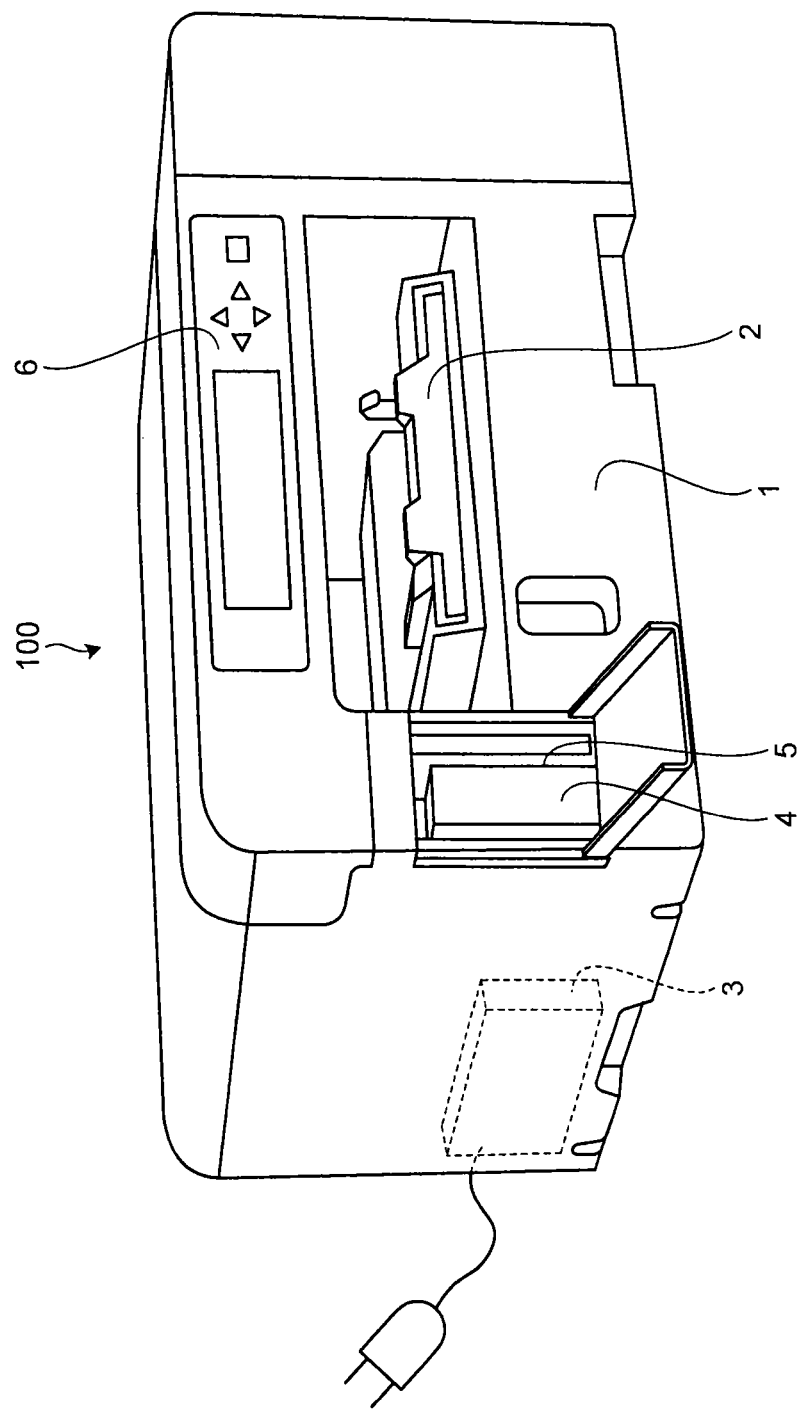
FIG. 1 is a perspective view illustrating an example of an external appearance of an image forming apparatus according to a first embodiment of the present invention.

FIG. 1 is a perspective view illustrating an example of an external appearance of the image forming apparatus according to a first embodiment of the present invention.

As illustrated in FIG. 1, this image forming apparatus 100 includes, in an apparatus body thereof, a paper feeding tray 1, a discharge tray 2, a main power supply 3, an auxiliary power supply 4, an auxiliary power supply loading unit 5, and an operation/display unit 6, as a main configuration.

The paper feeding tray 1 is provided to load sheets serving as the recording media loaded in the image forming apparatus 100. The sheets on which an image is recorded (formed) are accumulated in the discharge tray 2.

The main power supply 3 feeds power from a commercial power supply (AC power supply) to the image forming apparatus 100. The main power supply 3 converts an alternating-current voltage supplied from the commercial power supply into a direct-current voltage, and feeds the direct-current voltage to the image forming apparatus 100.

The auxiliary power supply (hereinafter also referred to as a battery) 4 is configured to be removable by a user by opening and closing a cover of the auxiliary power supply loading unit 5 provided on one end side of a front surface of the apparatus body. The auxiliary power supply 4 feeds power to the image forming apparatus 100 when no power is supplied from the commercial power supply. Having the auxiliary power supply 4 allows the image forming apparatus 100 to form images by being driven by the auxiliary power supply 4, for example, when the commercial power supply is unavailable in a use environment, or during a power outage. The auxiliary power supply 4 is configured to be usable not only for the image formation, but also for charging an information terminal apparatus such as a mobile phone.

The operation/display unit 6 is provided on an upper side of the front surface of the apparatus body, and has operation keys and a display screen arranged thereon. The display screen is provided with a touch panel, and various types of data can be entered from the operation keys and the touch panel.

Figure 2:
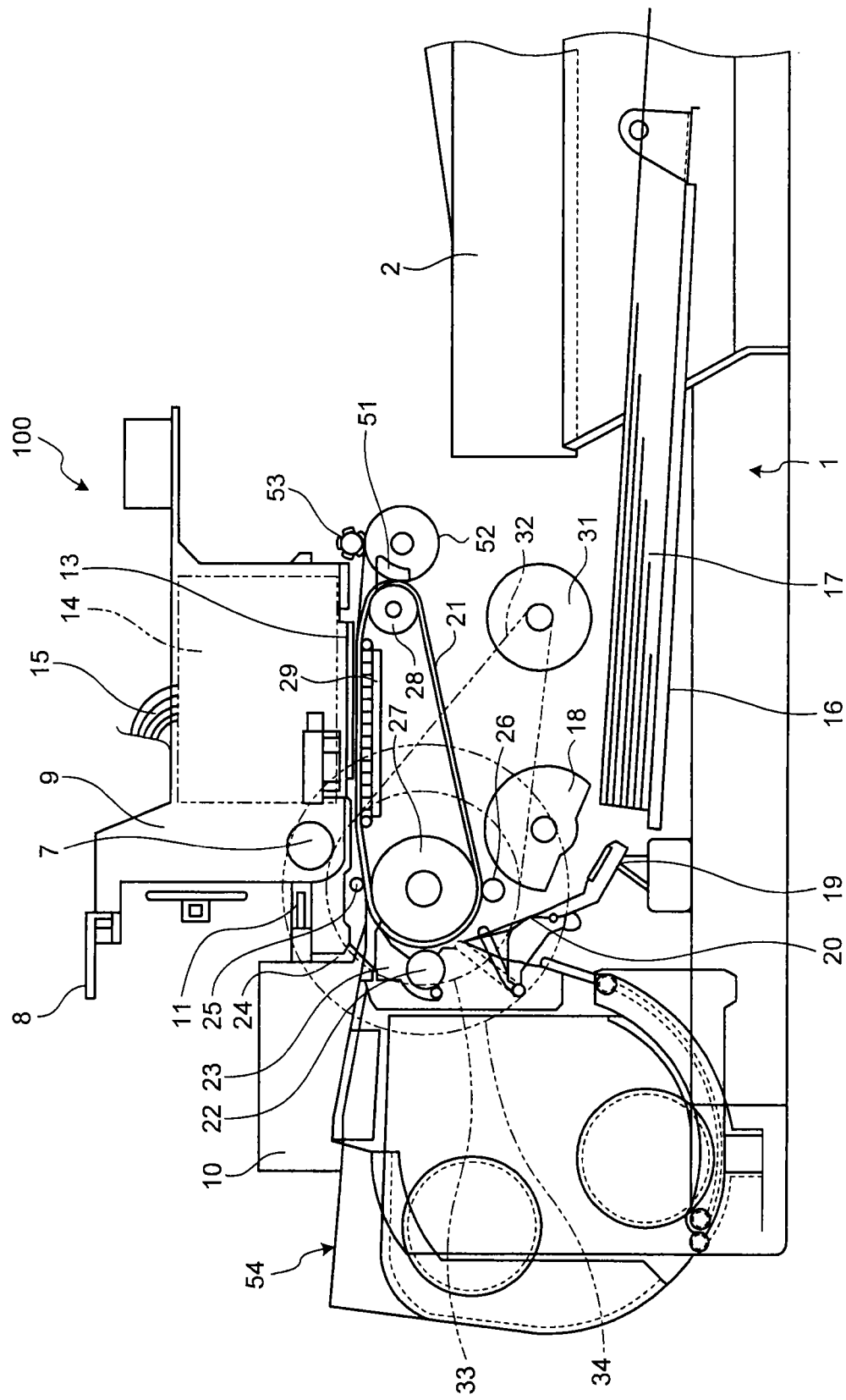
FIG. 2 is a side view illustrating an overall configuration of a mechanical part of the image forming apparatus according to the first embodiment.
Figure 3:
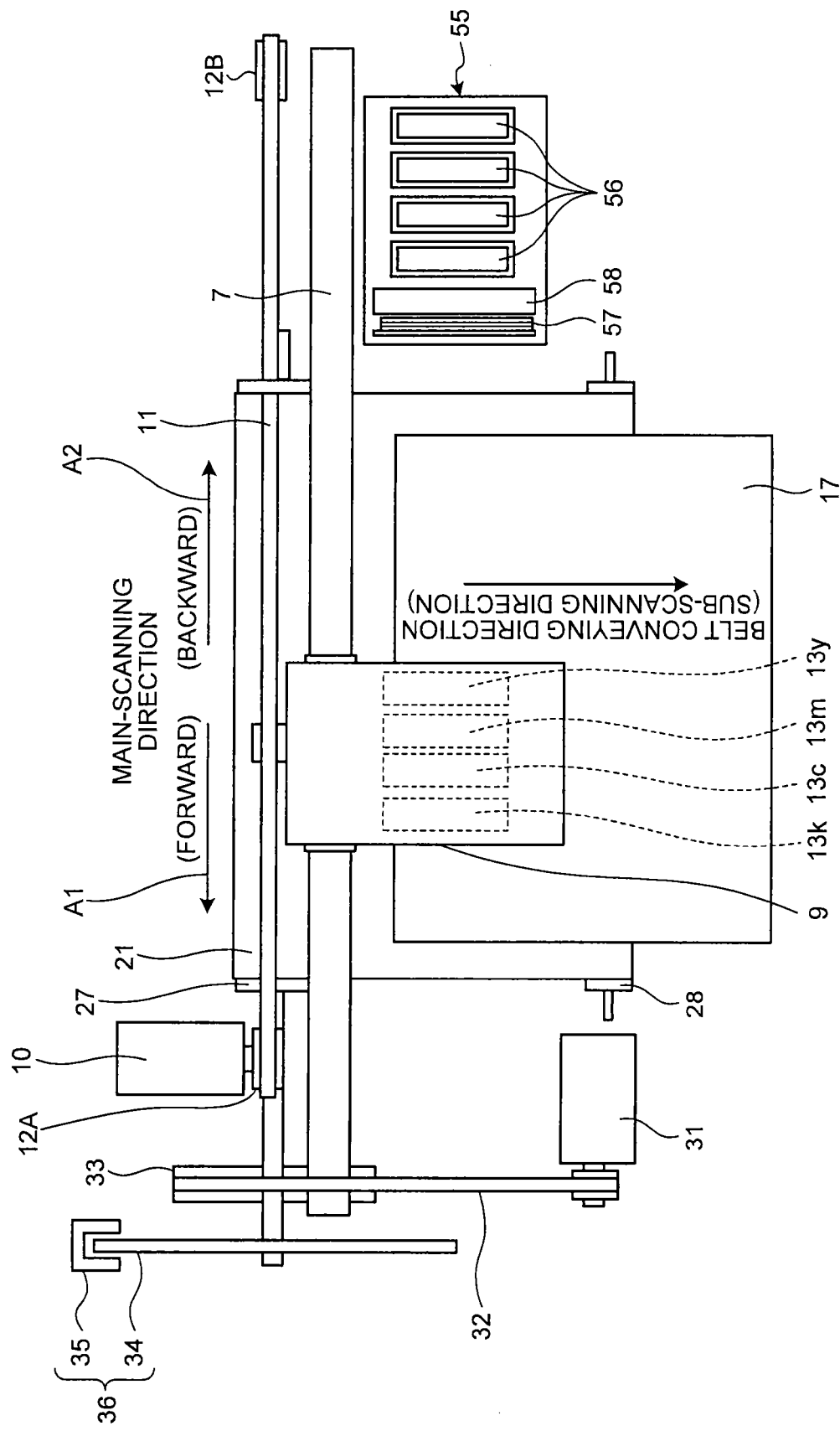
FIG. 3 is a plan view illustrating a configuration of the mechanical part of the image forming apparatus according to the first embodiment.

A configuration of a mechanical part of the image forming apparatus 100 will be described below. FIG. 2 is a side view illustrating an overall configuration of the mechanical part of the image forming apparatus according to the present embodiment. FIG. 3 is a plan view illustrating a configuration of the mechanical part of the image forming apparatus.

As illustrated in FIGS. 2 and 3, the image forming apparatus 100 includes a guide rod 7, a guide rail 8, a carriage 9, a main-scanning motor 10, a timing belt 11, a driving pulley 12A, and a driven pulley 12B. The carriage 9 is held so as to be slidable in the main-scanning direction along the guide rail 8 and the guide rod 7 that is a guide member horizontally laid between right and left side plates (not illustrated). The carriage 9 is moved by the main-scanning motor 10 via the timing belt 11 laid in a tensioned state between the driving pulley 12A and the driven pulley 12B for scanning in directions of arrows A1 and A2 (in the main-scanning direction) illustrated in FIG. 3.

The carriage 9 includes, for example, four print heads 13k, 13c, 13m, and 13y (any of the print heads is hereinafter referred to as "print head 13") that have liquid ejection heads ejecting ink droplets of droplets of black (K), cyan (C), magenta (M), and yellow (Y), respectively. The print head 13 has a plurality of ink ejection ports each arranged directed in a direction intersecting the main-scanning direction and mounted so as to eject the ink droplets downward.

The liquid ejection heads constituting the print head 13 can each include a pressure generating unit that generates a pressure to eject the liquid droplets. Examples of the pressure generating unit include, but are not limited to, a piezoelectric actuator including, for example, a piezoelectric element, a thermal actuator including, for example, a heat generating resistor, a shape memory alloy actuator using a metal phase change by a temperature change, and an electrostatic actuator using an electrostatic force.

The print head 13 is not limited to have the configuration of having the heads independent for the respective colors, but may have a configuration of having one or more liquid ejection heads that include a nozzle row composed of a plurality of nozzles for ejecting liquid droplets of a plurality of colors. The carriage 9 is equipped with sub-tanks 14 for the respective colors to feed the ink of the respective colors to the print head 13. The ink is replenished from main tanks (ink cartridges), which are not illustrated, via ink feed tubes 15.

The image forming apparatus 100 includes a semicircular roller (paper feeding roller) 18 and a separation pad 19, as a paper feeding unit for feeding sheets 17 loaded on a sheet loading unit (pressurizing plate) 16, such as the paper feeding tray (paper cassette) 1. The paper feeding roller 18 separates and feeds the sheets 17, sheet by sheet, from the sheet loading unit 16. The separation pad 19 is provided in a position facing the paper feeding roller 18, and is urged toward the paper feeding roller 18. The separation pad 19 is formed of a material having a large coefficient of friction.

The image forming apparatus 100 also includes a conveying belt 21, a counter roller 22, a conveyance guide 23, a pressing member 24, a pressing roller 25, and a roller charging device 26, as a conveying unit for conveying under the print head 13 each of the sheets 17 fed from the paper feeding unit. The conveying belt 21 conveys the sheet 17 by electrostatically attaching the sheet 17 to the conveying belt 21. The counter roller 22 sandwiches the sheet 17 fed from the paper feeding unit via a guide 20 between itself and the conveying belt 21, and conveys the sheet 17. The conveyance guide 23 changes the direction of the sheet 17 fed substantially vertically upward by approximately 90 degrees, and makes the sheet 17 follow a surface of the conveying belt 21. The pressing member 24 urges the pressing roller 25 toward the conveying belt 21, and presses the sheet 17 with the pressing roller 25. The roller charging device 26 charges the surface of the conveying belt 21.

The conveying belt 21 is an endless belt, and is wound between a carriage roller 27 and a tension roller 28. The conveying belt 21 is configured to circulate in the belt conveyance direction (sub-scanning direction) in FIG. 3 as a sub-scanning motor 31 rotates the carriage roller 27 via a timing belt 32 and a timing roller 33. A guide member 29 is placed on the back surface of the conveying belt 21 corresponding to an area for image formation by the print head 13.

The upper surface of the guide member 29 protrudes toward the print head 13 from a tangent line of the two rollers (the carriage roller 27 and the tension roller 28) supporting the conveying belt 21. This causes the conveying belt 21 to be pushed up and guided over the upper surface of the guide member 29 in the area for image formation so as to maintain accurate flatness of the conveying belt 21.

A plurality of grooves are formed in the main-scanning direction, that is, in the direction orthogonal to the conveyance direction, on a surface of the guide member 29 contacting the back surface of the conveying belt 21. These grooves reduce the area of contact with the conveying belt 21, and allows the conveying belt 21 to smoothly move along the surface of the guide member 29.

The roller charging device 26 is placed so as to contact a surface layer of the conveying belt 21, and so as to rotate driven by the circular movement of the conveying belt 21. A pressing force of 2.5 N for the conveying belt 21 is applied to each end of a shaft of the roller charging device 26.

As illustrated in FIG. 3, a rotary encoder 36 includes a slit disc 34 and a sensor 35. The slit disc 34 is mounted on a shaft of the carriage roller 27, and provided with the sensor 35 that detects slits of the slit disc 34.

The image forming apparatus 100 further includes a separation claw 51, a discharging roller 52, a discharging roller 53, and the discharge tray 2, as a discharging unit for discharging the sheet 17 on which recording has been made by the print head 13. The separation claw 51 separates the sheet 17 from the conveying belt 21. The discharging rollers 52 and 53 sandwich the sheet 17 therebetween and discharge it. The discharge tray 2 accumulates the sheets 17 discharged below the discharging roller 52. The difference in height from a nip between the discharging rollers 52 and 53 to the discharge tray 2 is set to a comparatively large value to allow more sheets to be accumulated in the discharge tray 2.

A double-sided paper feeding unit 54 is removably mounted on the back of the image forming apparatus 100. The double-sided paper feeding unit 54 takes in and turns over the sheet 17 returned by reverse rotation of the conveying belt 21, and feeds again the sheet 17 between the counter roller 22 and the conveying belt 21. A bypass paper feeding unit (not illustrated in FIG. 2) is provided on the upper surface of the double-sided paper feeding unit 54.

Furthermore, as illustrated in FIG. 3, a maintenance and recovery mechanism 55 is placed, as a unit for maintenance to maintain and recover states of nozzles of the print head 13, at a non-printing area on one side in the scanning direction of the carriage 9.

The maintenance and recovery mechanism 55 includes caps 56, a wiper blade 57, and an idle ejection receiver 58. The caps 56 cap respective nozzle faces of the print head 13. The wiper blade 57 is a blade member for wiping the nozzle faces. The idle ejection receiver 58 receives liquid droplets when idle ejection is performed to eject the liquid droplets that do not contribute to recording so as to discharge a thickened recording liquid.

In the thus configured image forming apparatus 100, the sheets 17 are separated and fed, sheet by sheet, from the paper feeding tray 1. Each of the sheets 17 is fed substantially vertically upward, and guided by the guide 20. Then, the sheet is conveyed while being sandwiched between the conveying belt 21 and the counter roller 22. Further, the sheet 17 is guided, at the leading end thereof, by the conveyance guide 23, pressed onto the conveying belt 21 by the pressing roller 25, and changed in the conveyance direction thereof by approximately 90 degrees.

At this time, an engine control unit 324 (not illustrated in FIG. 3) controls an AC bias supply unit to apply an alternating voltage that alternately repeats positive and negative polarities to the roller charging device 26 so as to charge the conveying belt 21 in an alternating charging voltage pattern. Specifically, the conveying belt 21 is charged in a pattern in which the positive and negative polarities are repeated at predetermined widths in the sub-scanning direction that is the direction of circulation. The sheet 17 fed onto the conveying belt 21 thus charged is attached by the electrostatic force to the conveying belt 21, and the circulating movement of the conveying belt 21 conveys the sheet 17 in the sub-scanning direction.

The image forming apparatus 100, then, drives the print head 13 according to image signals while moving the carriage 9 in forward and backward directions so as to record one line of the image data by ejecting the ink droplets onto the stationary sheet 17, and after carrying the sheet 17 by a predetermined amount, records the next line. By receiving a record end signal or a signal indicating arrival of the trailing end of the sheet 17 at the recording area, the image forming apparatus 100 ends the recording operation, and discharges the sheet 17 to the discharge tray 2.

In the case of duplex printing, when the recording on the front surface (on which printing is first made) is finished, the image forming apparatus 100 rotates the conveying belt 21 in the reverse direction so as to feed the recorded sheet 17 into the double-sided paper feeding unit 54, and turns over the sheet 17. Then, the image forming apparatus 100 feeds again the sheet 17, with the back surface thereof serving as a printing surface, between the counter roller 22 and the conveying belt 21, and while performing timing control, the image forming apparatus 100 conveys the sheet 17 on the conveying belt 21 and performs printing on the back surface in the same manner as in the case of the recording on the front surface, thereafter discharging the sheet 17 to the discharge tray 2.

During a standby for printing (recording), the engine control unit 324 of the image forming apparatus 100 controls the carriage 9 to move toward the maintenance and recovery mechanism 55, where the caps 56 cap the nozzle faces of the print head 13 so as to keep the nozzles wet to prevent defective ejection due to drying of the ink. The engine control unit 324 also performs, as a maintenance operation, for example, a recovery operation in which the recording liquid is suctioned from the nozzles while the print head 13 is capped by the caps 56, and thus, the thickened recording liquid and air bubbles are discharged. To clean off the ink attached to the nozzle faces of the print head 13 by the recovery operation, the engine control unit 324 controls the wiper blade 57 to perform wiping. The engine control unit 324 also performs idle ejection operation to eject ink not intended for the recording, before the start of or during the recording. In this manner, the engine control unit 324 maintains a stable ejection performance of the print head 13.

Figure 4:
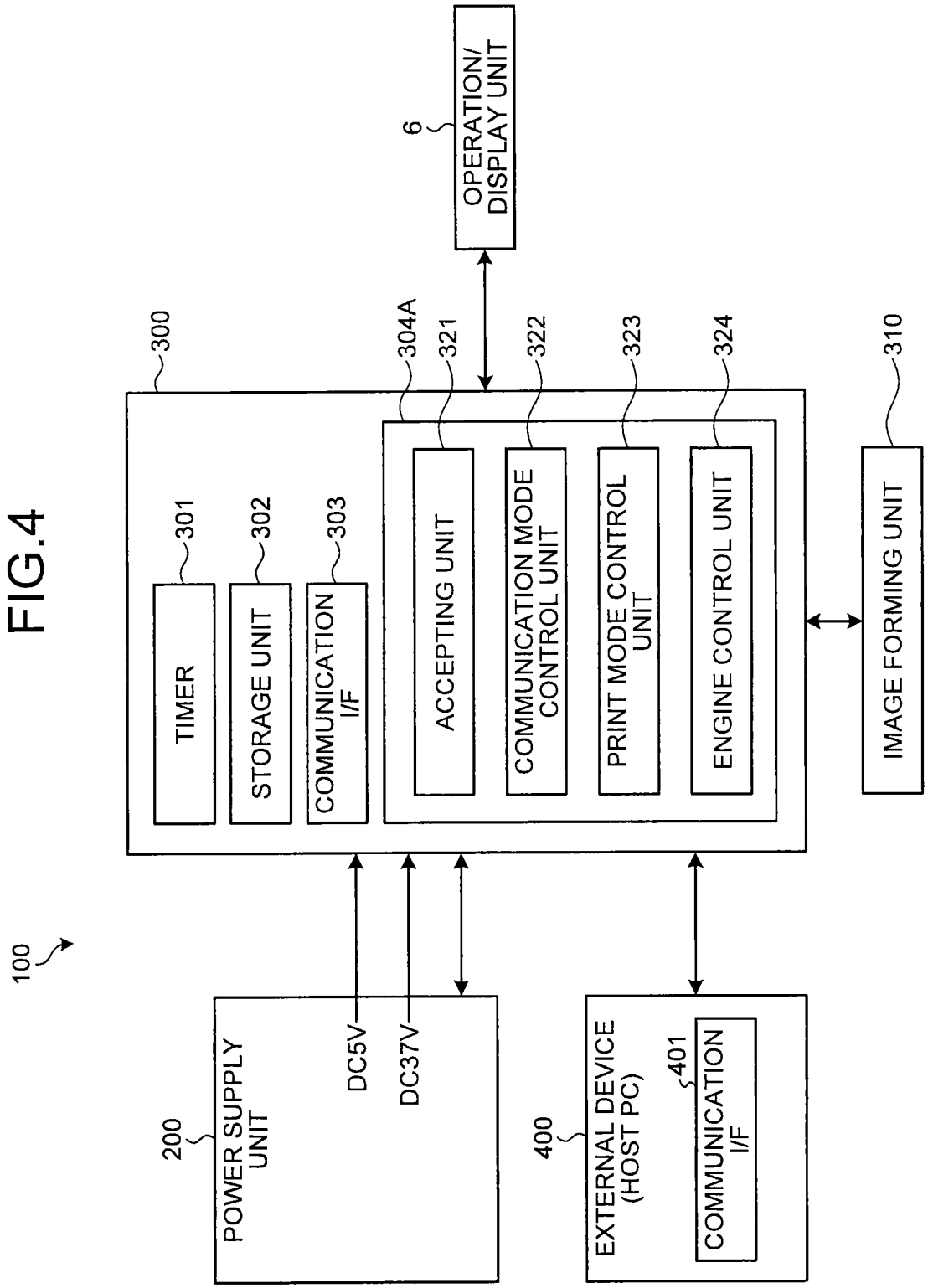
FIG. 4 is a block diagram explaining an overall configuration example of the image forming apparatus according to the first embodiment.
Figure 5:
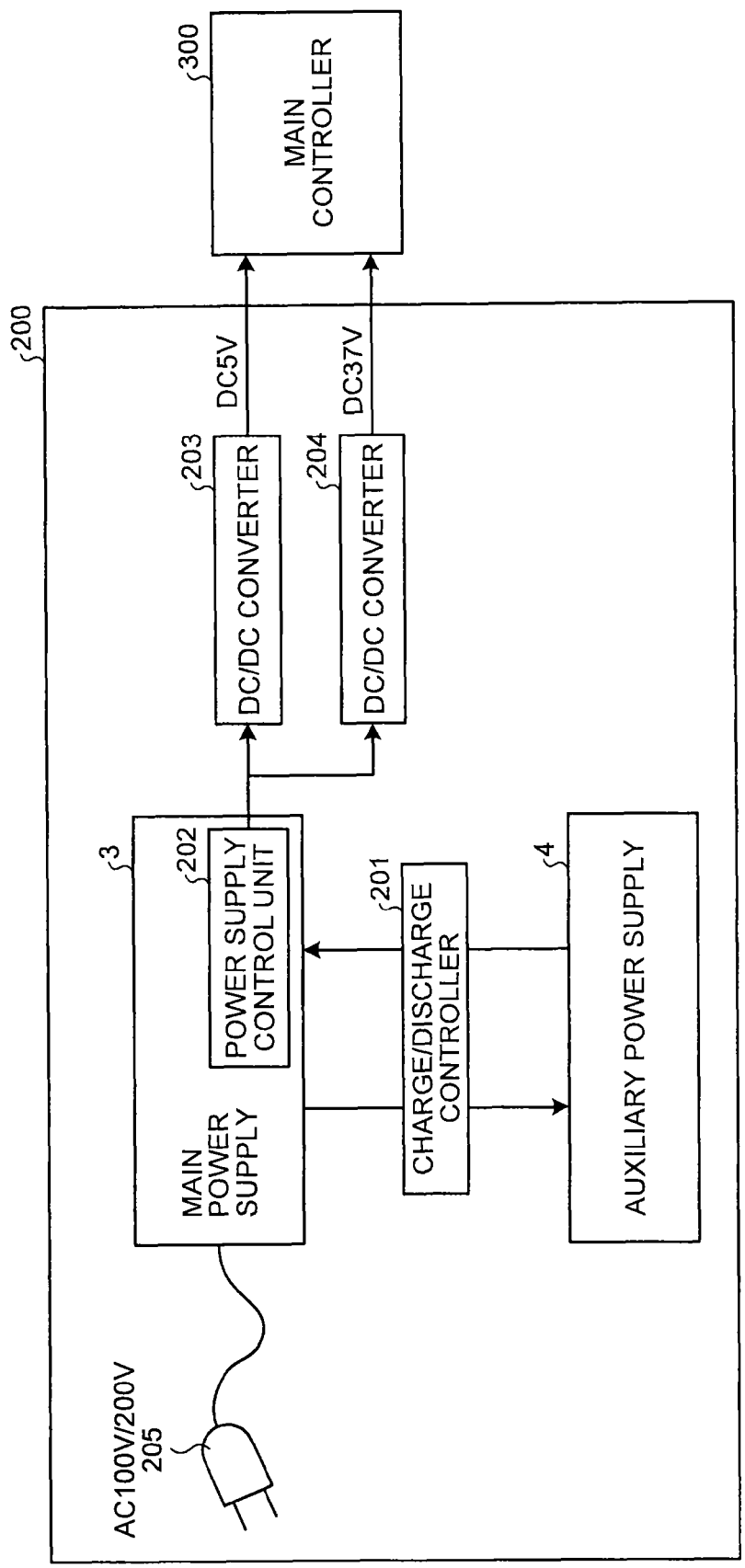
FIG. 5 is a block diagram explaining a configuration example of a power supply unit of the image forming apparatus according to the first embodiment.
Figure 6:
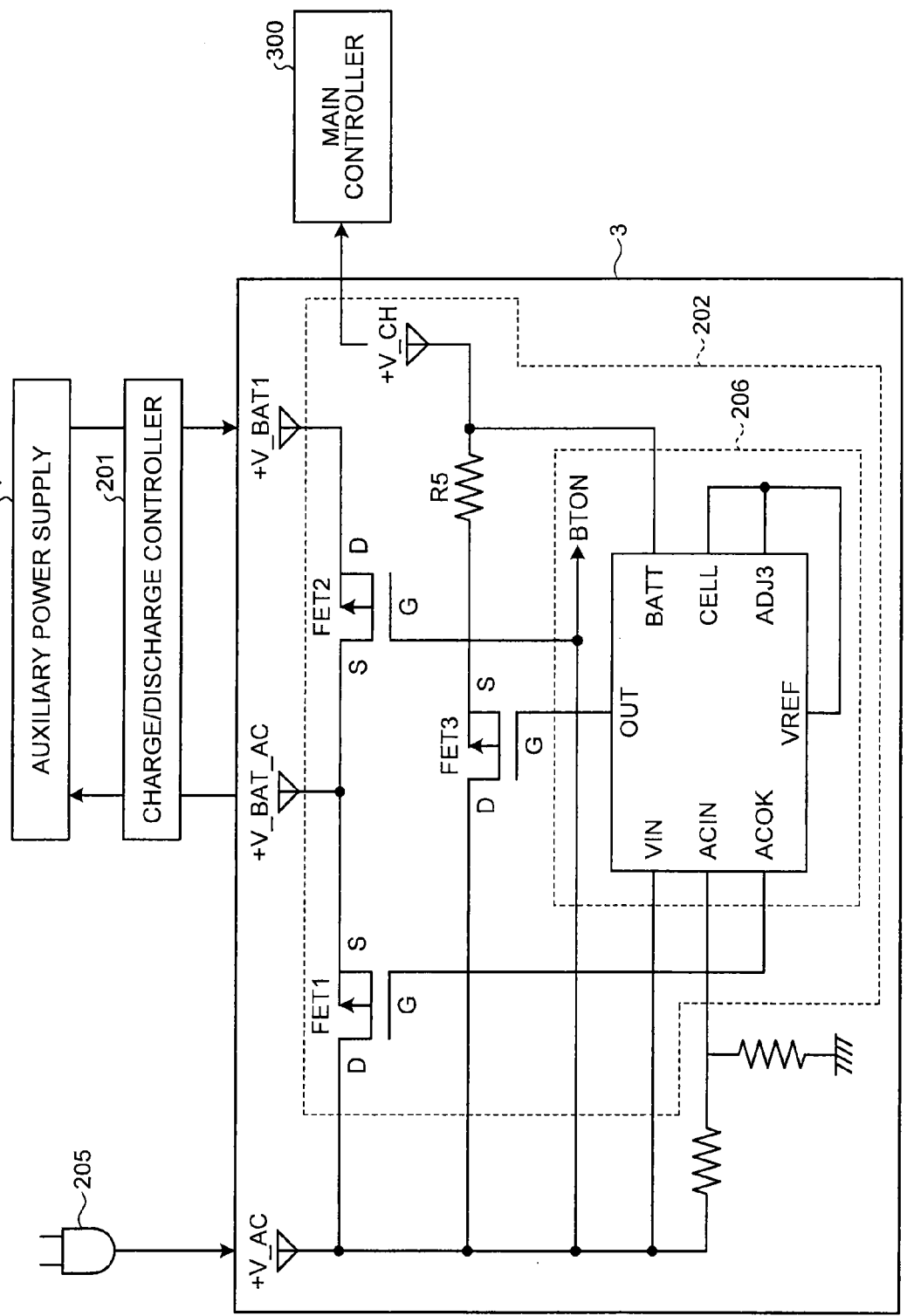
FIG. 6 is a block diagram explaining a configuration example of a power supply control circuit serving as a power supply control unit of the image forming apparatus according to the first embodiment.

An overall configuration example of the image forming apparatus will be described below. FIG. 4 is a block diagram explaining the overall configuration example of the image forming apparatus according to the present embodiment. FIG. 5 is a block diagram explaining a configuration example of a power supply unit. FIG. 6 is a block diagram explaining a configuration example of a power supply control circuit serving as a power supply control unit.

As illustrated in FIG. 4, the image forming apparatus 100 includes a power supply unit 200, a main controller 300, the operation/display unit 6, and an image forming unit 310.

As illustrated in FIG. 5, the power supply unit 200 includes the main power supply 3, the auxiliary power supply 4, a charge/discharge controller 201, a power supply control unit 202, and DC/DC converters 203 and 204. The main power supply 3 includes the power supply control unit 202. The main power supply 3 supplies the power from the commercial power supply (AC power supply). The main power supply 3 has a plug 205 that can be plugged into an outlet to which the commercial power is supplied. Plugging the plug 205 into the outlet connects the commercial power supply to the main power supply 3, which is, in turn, supplied with the power from the commercial power supply. The main power supply 3 feeds the power supplied from the commercial power supply to the power supply control unit 202. The alternating-current voltage is converted into a direct-current voltage, which is then converted, via the DC/DC converters 203 and 204, into a direct-current voltage that can be used in the image forming unit 310. In the present embodiment, a DC of 5 V and a DC of 37 V are fed at least to the main controller 300.

The auxiliary power supply 4 is, for example, a battery that can be charged and discharged. The power supplied from the main power supply 3 is fed to the auxiliary power supply 4 via the charge/discharge controller 201, and the auxiliary power supply 4 is charged. When no power is supplied from the commercial power supply, the auxiliary power supply 4 feeds power to the power supply control unit 202 via the charge/discharge controller 201. The power is converted, via the DC/DC converters 203 and 204, into that of the direct-current voltage that can be used in the main controller 300 and the image forming unit 310. In the present embodiment, the DC of 5 V and the DC of 37 V are fed at least to the main controller 300.

Under the control of the main controller 300, the charge/discharge controller 201 controls the charge and discharge of the auxiliary power supply 4. The charge/discharge controller 201 also detects the amount of charge (remaining capacity) of the auxiliary power supply 4. For example, the charge/discharge controller 201 can detect the amount of charge of the auxiliary power supply 4 based on an integrated current value in the auxiliary power supply 4 and a deterioration rate of capacity obtained from a temperature and the number of charging of the auxiliary power supply 4. The amount of charge of the auxiliary power supply 4 can be detected not only by this, but also by any method.

Under the control of the main controller 300, the charge/discharge controller 201 also switches between supply and stop of the power from the main power supply 3 to the auxiliary power supply 4. To charge the auxiliary power supply 4 with the power from the main power supply 3, the main controller 300 controls the charge/discharge controller 201 so as to feed the power from the main power supply 3 to the auxiliary power supply 4 via the charge/discharge controller 201.

The power supply control unit 202 includes a detection unit 206. Under the control of the main controller 300, the power supply control unit 202 switches the power supply source for at least the main controller 300. For example, the power supply control unit 202 can switch the power supply source to the main power supply 3 or to the auxiliary power supply 4. In the present embodiment, the power supply control unit 202 performs control of switching the power supply source to the main power supply 3 when power is supplied from the commercial power supply, or to the auxiliary power supply 4 when no power is supplied from the commercial power supply. In other words, the power supply control unit 202 performs control of switching the power supply source to the auxiliary power supply 4 when the main power supply 3 is off, and control of switching the power supply source to the main power supply 3 when the main power supply 3 is on.

Under the control of the main controller 300, the power supply control unit 202 can also switch a power supply destination (or power supply destinations). For example, the power supply control unit 202 can switch the power supply destinations to both the main controller 300 and the image forming unit 310, or switch the power supply destination to only the main controller 300.

A description will be made of the power supply switching control by the power supply control unit 202 of the main power supply 3. As illustrated in FIG. 6, in the power supply control circuit of the power supply control unit 202, when the plug 205 is placed into a plugged-in state (+V_AC) of being connected to the commercial power supply, ACIN is detected, ACOK is set to Low level, and BTON is set to Hi level in the detection unit 206. At this time, in the power supply control circuit, FET1 is turned on, so that +V_BAT_AC is supplied with power of +V_AC. This allows the charge/discharge controller 201 to feed the power to the auxiliary power supply 4 to charge it. The power supply control unit 202 feeds power from +V_CH at least to the main controller 300.

In the power supply control circuit, disconnecting the plug 205 from the commercial power supply while the auxiliary power supply 4 is connected turns FET2 on, and thereby feeds power from +V_BAT1. In this case, BTON is set to Low level in the detection unit 206. The power from the auxiliary power supply 4 is fed via +V_CH at least to the main controller 300. In this manner, the power supply control unit 202 performs the control to switch the power supply source to the main power supply 3 or the auxiliary power supply 4.

A description will be made of timing diagrams of the power supply in the power supply control circuit. FIGS. 7A to 7D are diagrams explaining the timing diagrams of the power supply in the power supply control circuit according to the present embodiment.

Figure 7A:
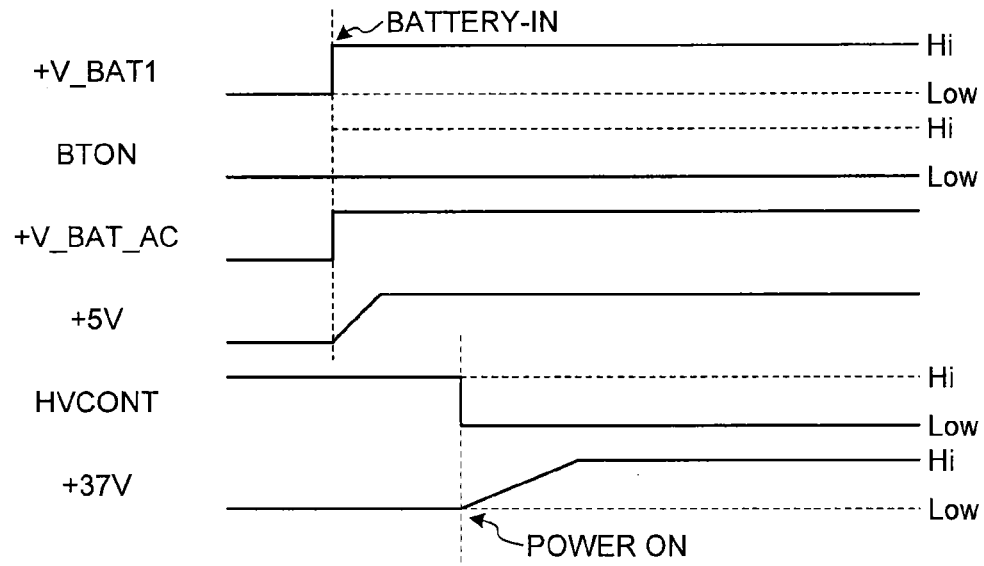
FIG. 7A is a diagram explaining a timing diagram of a power supply in the power supply control circuit according to the first embodiment.

FIG. 7A is a timing diagram of the power supply when the power is supplied only from the battery. As illustrated in FIG. 7A, in the power supply control circuit, loading the battery 4 (battery-in) causes +V_BAT1 to change from Low level to Hi level, and keeps BTON at Low level. At this time, the detection unit 206 detects that BTON is at Low level. HVCONT changes from Hi level to Low level, and +37V changes from Low level to Hi level, thereby turning the power on. HVCONT is an enable signal for the DC/DC converter 204 of 37 V, and is a signal received from the main controller 300.

Figure 7B:
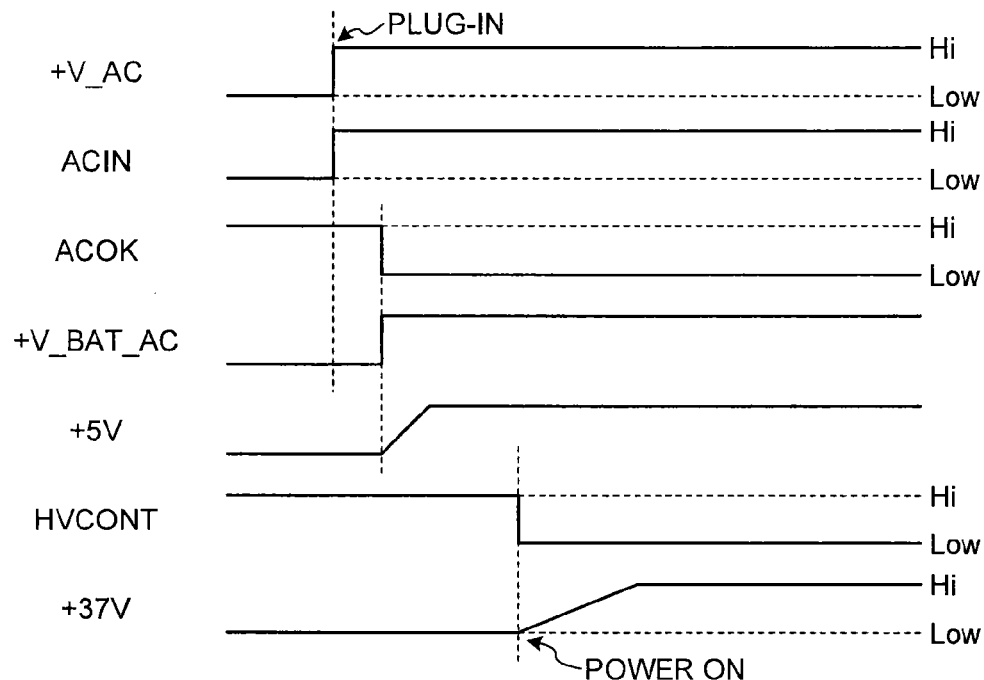
FIG. 7B is a diagram explaining a timing diagram of the power supply in the power supply control circuit according to the first embodiment.

FIG. 7B is a timing diagram of the power supply when the power is supplied only from the main power supply (commercial power supply). As illustrated in FIG. 7B, in the power supply control circuit, connecting the plug 205 to the commercial power supply (plug-in) changes the +V_AC from Low level to Hi level, ACIN from Low level to Hi level, and ACOK from Hi level to Low level. At this time, the detection unit 206 detects that ACIN is at Hi level, ACOK is at Low level, and BTON is at Hi level (not illustrated). HVCONT changes from Hi level to Low level, and +37V changes from Low level to Hi level, thereby turning the power on.

Figure 7C:
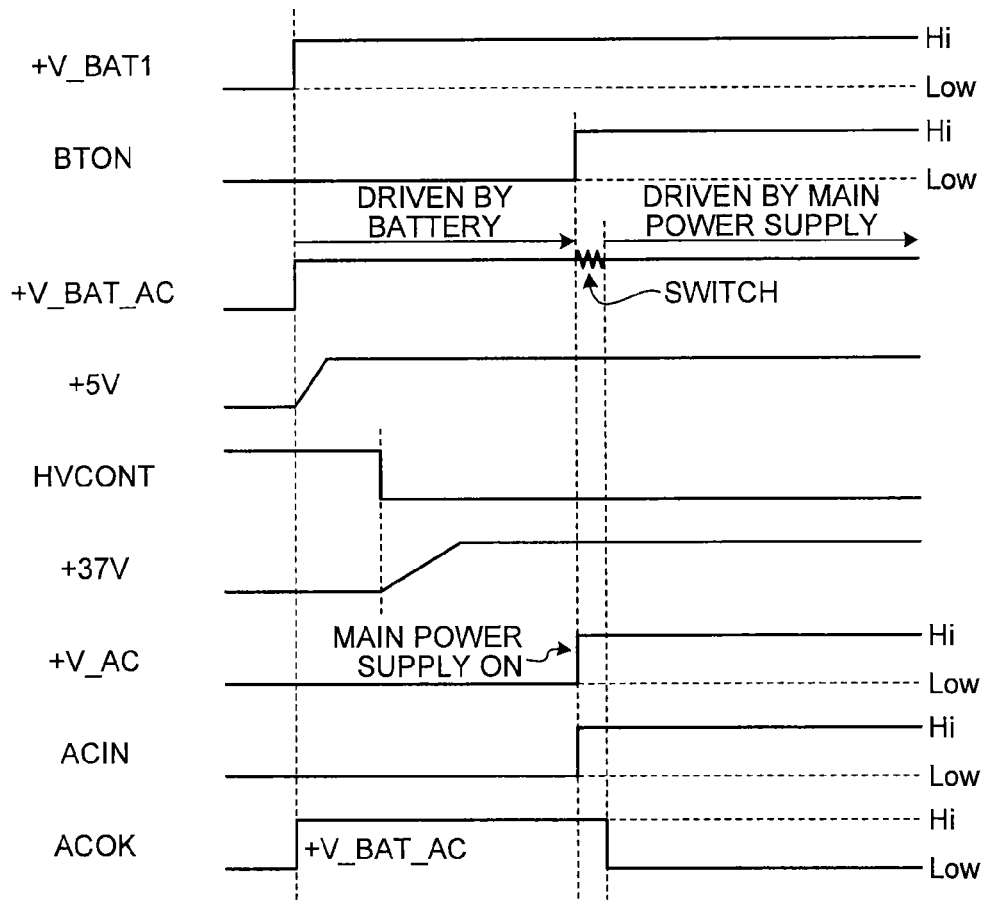
FIG. 7C is a diagram explaining a timing diagram of the power supply in the power supply control circuit according to the first embodiment.

FIG. 7C is a timing diagram of the power supply when the power supply is switched from the battery to the main power supply (commercial power supply). As illustrated in FIG. 7C, in the power supply control circuit, when the power is supplied from the battery 4, +V_BAT1 is at Hi level, and BTON is kept at Low level. Switching the power supply from the battery 4 to the main power supply 3 changes BTON from Low level to Hi level, +V_AC from Low level to Hi level, ACIN from Low level to Hi level, and ACOK from Hi level to Low level. At this time, the detection unit 206 detects that BTON is at Hi level, ACIN is at Hi level, and ACOK is at Low level.

Figure 7D:
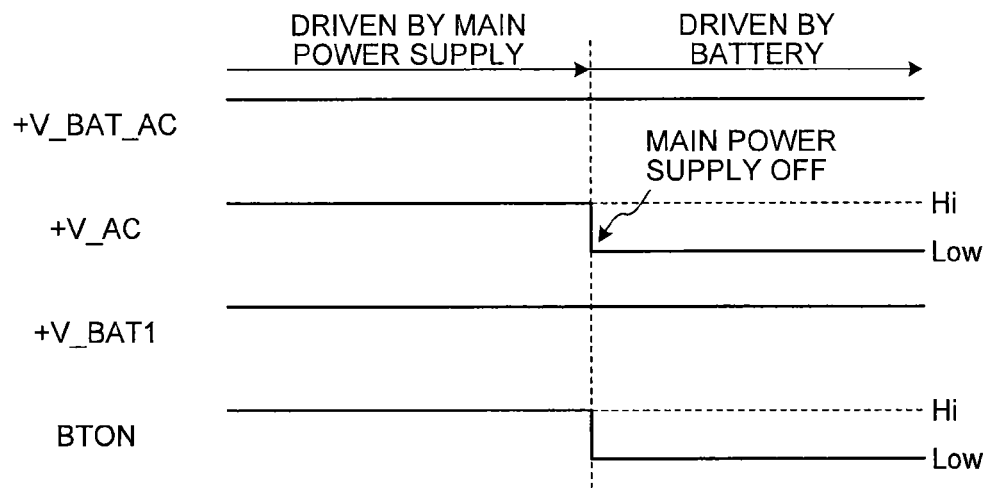
FIG. 7D is a diagram explaining a timing diagram of the power supply in the power supply control circuit according to the first embodiment.

FIG. 7D is a timing diagram of the power supply when the power supply is switched from the main power supply (commercial power supply) to the battery. As illustrated in FIG. 7D, in the power supply control circuit, when the power is supplied from the main power supply 3, +V_AC is kept at Hi level, and BTON is kept at Hi level. Switching the power supply from the main power supply 3 to the battery 4 changes +V_AC from Hi level to Low level, and BTON from Hi level to Low level. At this time, the detection unit 206 detects that BTON is at Low level.

In this manner, in the power supply control circuit of the main power supply 3, the detection unit 206 can determine that the power supply source is the battery 4 if BTON is detected as Low level, or that the power supply source is the main power supply 3 if BTON is detected as Hi level. The detection unit 206 can also determine that the power supply source is the main power supply 3 if ACOK is detected as Low level, or that the power supply source is the battery 4 if ACOK is detected as Hi level. Thus, the detection unit 206 can determine whether the power supply source is the main power supply 3 (commercial power supply) or the battery 4 by detecting whether BTON or ACOK is either at Hi level or at Low level.

The main controller 300 will be described below. As illustrated in FIG. 4, the main controller 300 controls the overall operation of the image forming apparatus 100 in an integrated manner. The main controller 300 includes a timer 301, a storage unit 302, a communication I/F 303, and a control unit 304A.

The timer 301 measures time. The timer 301 may have a real-time clock function of counting the current time. The storage unit 302 stores various types of data.

The communication I/F (hereinafter also referred to as an interface) 303 transfers data to and from, for example, an external device (hereinafter also referred to as a host PC) 400 provided with a communication I/F 401. The communication I/F 303 receives, for example, image data from the external device 400 via a cable or a network, and transfers the data and other information to an accepting unit 321. Examples usable as the communication I/F 303 include, but are not limited to, communication interfaces conforming to the IEEE1394 standard and interfaces conforming to the conforming to universal serial bus (USB) standard. These communication interfaces can switch the transfer rate under the control of a communication mode control unit 322. For example, the USB standard version 2.0 supports a plurality of data transfer rates, such as 480 Mbps in a high-speed mode and 12 Mbps in a full-speed mode (low-speed mode).

The control unit 304A controls various parts of the image forming apparatus 100. The control unit 304A has a configuration including, for example, a central processing unit (CPU) constituted, for example, by a microprocessor, a read-only memory (CPU), and a random access memory (RAM). As illustrated in FIG. 4, the control unit 304A has functions including the accepting unit 321, the communication mode control unit 322, a print mode control unit 323, and the engine control unit 324. The functions included in the control unit 304A are implemented by execution by the CPU in the control unit 304A of a predetermined control program stored, for example, in the ROM. However, not limited to this, at least some of the functions can be implemented by individual circuits (hardware).

The accepting unit 321 accepts various inputs from the operation/display unit 6 and the external device 400, and transfers various settings to the control unit 304A. The various inputs include a print job and various setting inputs, such as settings for various operational states of the image forming apparatus 100. The print job is a command signal to request printing of print data included in the print job. The number of pieces of print data (number of printed copies) included in the print job can be set to any value. The print data is described in a language, such as a page description language (PDL). The print job can be treated as an image formation request of requesting the image forming unit 310 to form an image.

The communication mode control unit 322 controls the data transfer rate between the image forming apparatus 100 and the external device 400. Details of the communication mode control unit 322 will be described later.

The print mode control unit 323 controls the print speed in the image forming unit 310 of the image forming apparatus 100. Details of the print mode control unit 323 will be described later.

The engine control unit 324 controls the operation of the image forming unit 310. Specifically, when the accepting unit 321 has accepted a print job, the engine control unit 324 performs image processing of print data contained in the accepted print job. For example, the engine control unit 324 converts the print data described in a language, such as the PDL, into image data drawn in a format (such as a bitmap format) printable by the image forming unit 310. Based on the converted image data, the engine control unit 324 controls the image forming unit 310 so as to form an image (perform printing) on a medium, such as a recording sheet. In other words, under the control of the engine control unit 324, the image forming unit 310 performs printing based on the print data contained in the print job.

The operation/display unit 6 includes the display screen and the operation keys. The display screen includes the touch panel. The display screen displays various screens and information on the image forming apparatus 100, and allows the user to perform input operations for the various settings from the touch panel. The operation keys are operation devices that accept various inputs from the user.

The image forming unit 310 includes the print heads 13. The image forming unit 310 forms the image on the medium, such as a recording sheet, under the control of the main controller 300. For example, the image forming unit 310 is equipped with at least the four print heads 13 that have the liquid ejection heads ejecting ink droplets of the respective four colors of black (K), cyan (C), magenta (M), and yellow (Y) as recording agents. The image forming unit 310 forms the image by ejecting the liquid droplets from the print heads 13 onto the recording medium. In the present embodiment, the overall configuration of the mechanical part of the image forming apparatus 100 and the configuration of the mechanical part of the image forming unit 310 are as described above using FIGS. 2 and 3, and the detailed description thereof will be omitted.

The communication mode control unit 322 will be described below. The following embodiments will be described by exemplifying an interface conforming to the universal serial bus (USB) standard as an example of the communication I/F 303. However, not limited to this, any communication I/F that can switch the data transfer rate can be used in either of the embodiments.

As illustrated in FIG. 4, the communication mode control unit 322 controls the rate of the data transfer via the communication I/F 303 of the image forming apparatus 100 and the communication I/F 401 of the external device 400. The communication I/Fs 303 and 401 are, for example, communication interfaces conforming to the universal serial bus (USB) standard, or, for example, USB connectors conforming to the USB standard version 2.0. The communication I/Fs 303 and 401 are communication connectors to which a USB cable (not illustrated) is connected.

The image forming apparatus 100 can transfer data to and from, the host PC 400 via the USB cable. For example, the USB standard version 2.0 supports a plurality of data transfer rates of 480 Mbps in a first high-speed mode and 12 Mbps in a first low-speed mode. The communication mode control unit 322 controls setting of, for example, the data transfer rate between the image forming apparatus 100 and the host PC 400. The communication mode control unit 322 negotiates a communication protocol with the host PC 400, and sets the data transfer rate before starting the data transfer.

Specifically, the data transfer rate is automatically selected by negotiating the communication protocol between the communication interfaces connected to each other before the data transfer starts. For example, if one of the communication interfaces supports the first high-speed mode while the other thereof only supports the first low-speed mode, data cannot be transferred in the first high-speed mode. Consequently, each of the communication interfaces checks the specification of the other through the negotiation, and selects the first high-speed mode if both support the first high-speed mode, but selects the first low-speed mode if either of them does not support the first high-speed mode, thus selecting the transfer rate according to the respective specifications.

Negotiation here means to determine communication settings between two devices, such as a computer and a peripheral device, while exchanging information, such as a communication speed, with each other when the two devices establish communication. For example, communication speeds, error correction functions, and data compression procedures supported by computers and peripheral devices may differ device by device. Consequently, before communication starts, the communication mode control unit 322 exchanges information, through exchange of special signals, about which mode of which standard is supported by a communication partner device, and finds functions and performances supported by both of the communication partners. At the time of connection, the communication mode control unit 322 makes a setting so as to perform the communication at optimal settings, and establishes the connection.

If, based on the signal detected by the detection unit 206, the power supply source is the auxiliary power supply 4, the communication mode control unit 322 performs control so as to prohibit the data transfer from being performed at the rate of the first high-speed mode. If the communication mode control unit 322 performs the control so as to prohibit the high-speed data transfer, the communication mode control unit 32 notifies the host PC 400 of the information that the data transfer can only be performed at the rate of the first low-speed mode in the negotiation of the transfer rate with the host PC 400. Even if the host PC 400 supports the high-speed data transfer, while the image forming apparatus 100 is using the auxiliary power supply 4 as the driving power supply, the communication mode control unit 322 performs control not to allow the first high-speed mode to be selected but to set the mode to the first low-speed mode in the negotiation.

This allows the image forming apparatus 100 to prevent the data communication from consuming much power of the auxiliary power supply 4, and thus to extend the duration of the auxiliary power supply 4, because the data communication is performed in the first low-speed mode allowing lower power consumption.

Figure 8:
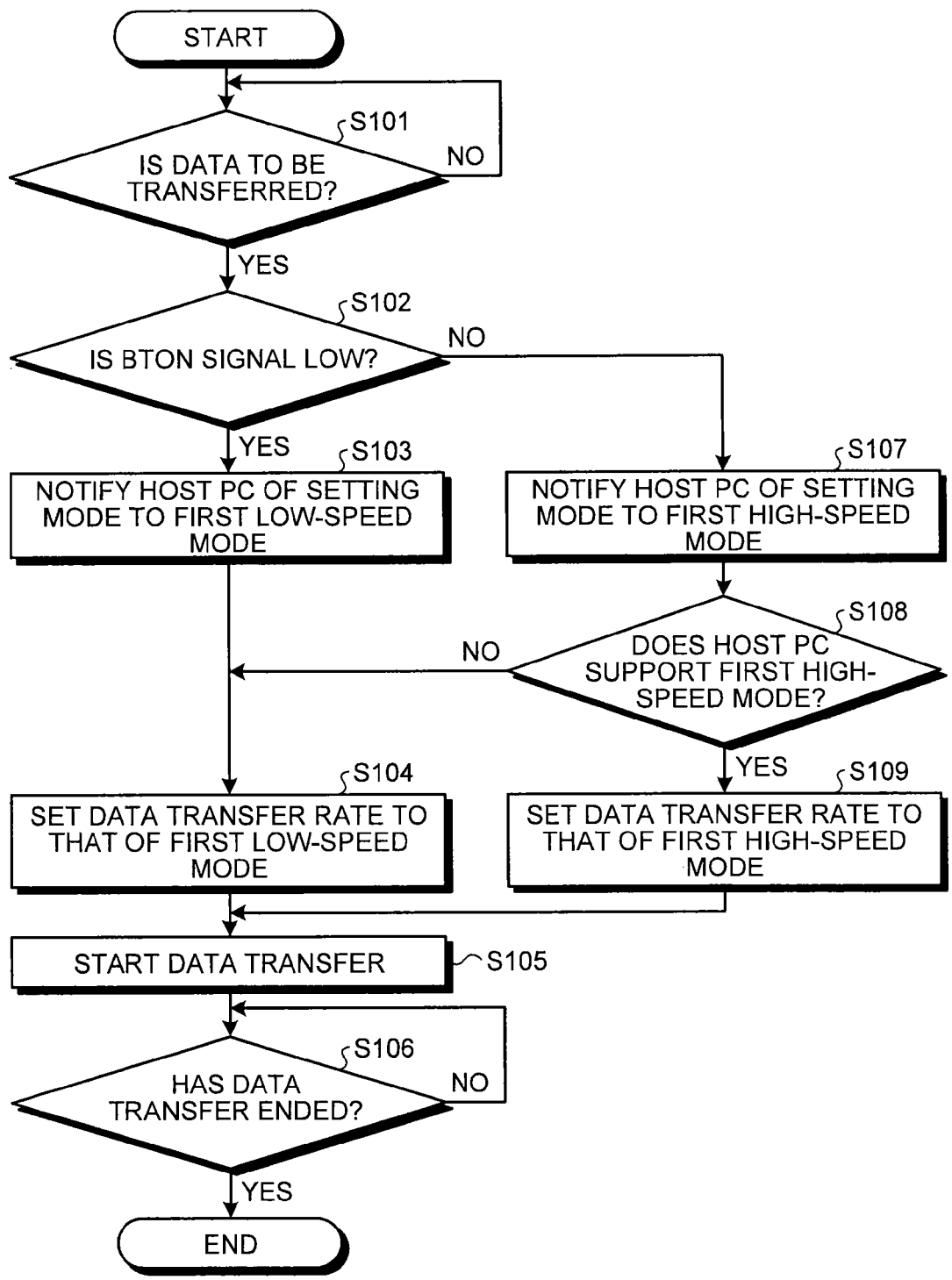
FIG. 8 is a flowchart illustrating an example of a procedure for a control operation of a communication mode control unit of the image forming apparatus according to the first embodiment.

A description will be made of a control operation example of the communication mode control unit 322. FIG. 8 is a flowchart illustrating an example of a procedure for the control operation of the communication mode control unit of the present embodiment.

As illustrated in FIG. 8, the communication mode control unit 322 determines whether a command for data transfer has been issued to the image forming apparatus 100 (Step S101). If not (No at Step S101), the communication mode control unit 322 repeats the determination whether the command for data transfer has been issued. If the command for data transfer has been issued (Yes at Step S101), the communication mode control unit 322 determines whether the BTON signal detected by the detection unit 206 is at Low level (Step S102) to determine whether the power supply source of the image forming apparatus 100 is the main power supply 3 or the auxiliary power supply 4.

If the BTON signal is at Low level (Yes at Step S102), the communication mode control unit 322 determines that the power supply source is the auxiliary power supply 4, and notifies the host PC 400 that the data transfer rate is to be set to that of the first low-speed mode (Step S103).

Then, the communication mode control unit 322 sets the data transfer rate to that of the first low-speed mode (Step S104). Then, the communication mode control unit 322 starts the data transfer with the host PC 400 via the communication I/F 303 (Step S105). Then, the communication mode control unit 322 determines whether the data transfer with the host PC 400 has ended (Step S106).

If not (No at Step S106), the communication mode control unit 322 repeats the determination whether the data transfer has ended. If the data transfer has ended (Yes at Step S106), the communication mode control unit 322 ends the process.

Referring back to Step S102, if the BTON signal is not at Low level (No at Step S102), the communication mode control unit 322 determines that the power supply source is the main power supply 3, and notifies the host PC 400 that the data transfer rate is to be set to that of the first high-speed mode (Step S107). Then, the communication mode control unit 322 negotiates with the host PC 400, and determines whether the host PC 400 supports the first high-speed mode (Step S108).

If not (No at Step S108), the communication mode control unit 322 performs the process at Step S104 to set the data transfer rate to that of the first low-speed mode, and performs the process at Step S105 and later. If the host PC 400 supports the first high-speed mode (Yes at Step S108), the communication mode control unit 322 sets the data transfer rate to that of the first high-speed mode (Step S109). Then, the communication mode control unit 322 performs the process at Step S105 to start the data transfer with the host PC 400 via the communication I/F 303, and performs the process after Step S105.

By controlling the image forming apparatus 100 to perform the above-described process, the communication mode control unit 322 performs the communication mode control of controlling the data transfer rate to that of the first low-speed mode allowing lower power consumption when the apparatus is driven by the auxiliary power supply 4, and thus can reduce the power consumption.

In this manner, when the power supply source detected by the detection unit 206 is the auxiliary power supply 4, the communication mode control unit 322 of the present embodiment automatically sets the data transfer rate to that of the first low-speed mode allowing lower power consumption. This can reduce the power consumption when the apparatus is driven by the auxiliary power supply 4.

The print mode control unit 323 will be described below. While the embodiments will be described below by exemplifying an inkjet printer as an example of the image forming apparatus 100, the present invention is not limited to this, but can be applied to any type of image forming apparatus capable of switching the print speed.

The print mode control unit 323 controls the print speed in the image forming unit 310 of the image forming apparatus 100. Specifically, if, based on the signal detected by the detection unit 206, the power supply source is the auxiliary power supply 4, the print mode control unit 323 performs control of changing the setting of the print speed in the image forming unit 310 from a second high-speed mode to a second low-speed mode allowing lower power consumption.

In the example of the inkjet printer, the print mode control unit 323 performs control of, for example, switching the mode of a sheet feed control unit and a head drive control unit from the second high-speed mode to the second low-speed mode. Specifically, when the mode is the second low-speed mode, the print mode control unit 323 performs control of printing odd-numbered dots during forward scanning and even-numbered dots during backward scanning.

When the print speed is that of the second low-speed mode, the print mode control unit 323 controls the sheet conveyance speed to that of the second low-speed mode that is half the speed of the second high-speed mode, to perform the above-described printing operation. As a result, when the print speed is that of the second low-speed mode, the sheet conveyance speed is controlled to be that of the second low-speed mode allowing lower power consumption.

If the power supply source is the main power supply 3, the print mode control unit 323 performs control of printing, for example, one line during a one-way scan in the second high-speed mode. Consequently, the sheet conveyance speed is controlled to be that of the second high-speed mode.

Thus, in the present embodiment, reducing the productivity of image formation by setting the print speed to that of the second low-speed mode can reduce the power consumption required for printing, and thereby, can reduce the power consumption of the auxiliary power supply 4.

Figure 9:
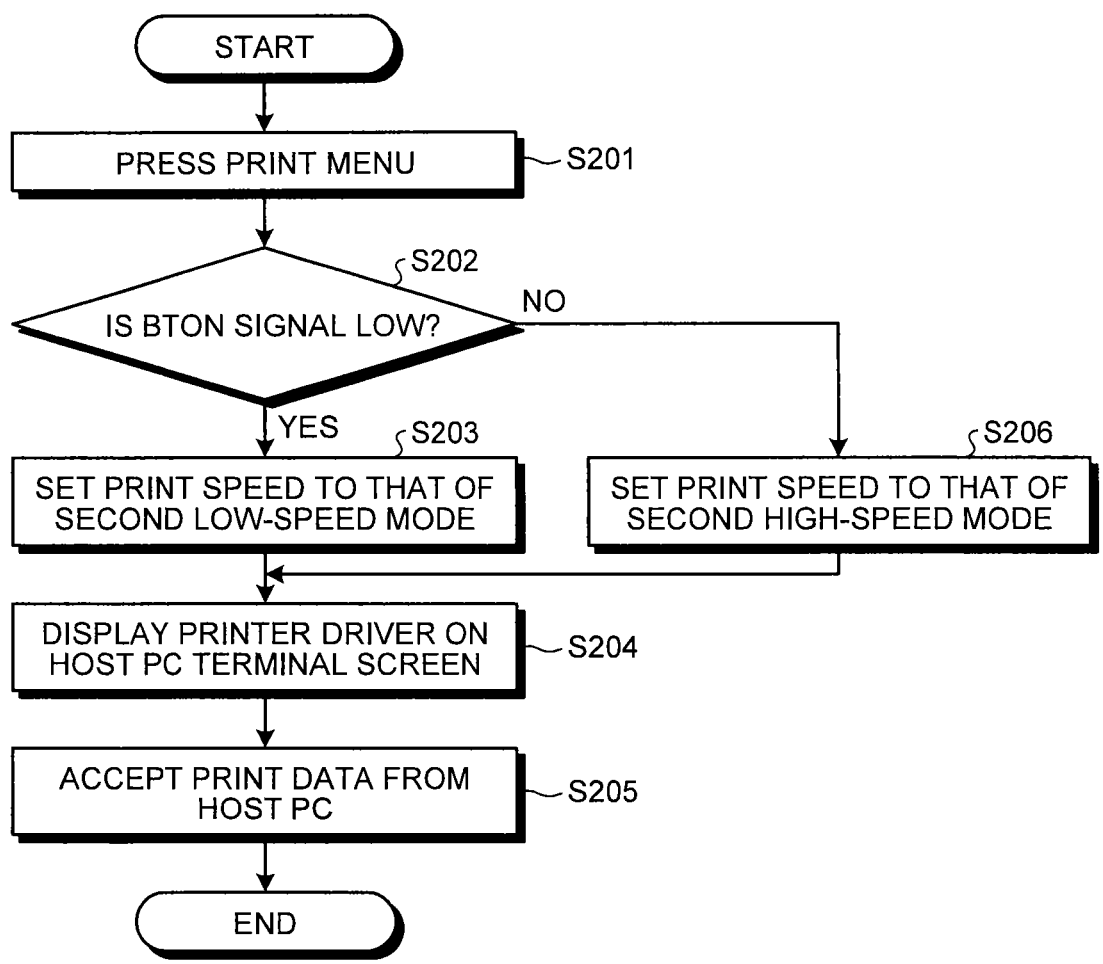
FIG. 9 is a flowchart illustrating an example of a procedure for a control operation of a print mode control unit of the image forming apparatus according to the first embodiment.

A description will be made of a control operation example of the print mode control unit 323. FIG. 9 is a flowchart illustrating an example of a procedure for the control operation of the print mode control unit of the present embodiment.

As illustrated in FIG. 9, for example, the user presses a print menu to instruct the host PC 400 to start printing a document created using any of various types of application software (such as word processing software) installed on the host PC 400 (Step S201).

To determine whether the power supply source of the image forming apparatus 100 is the main power supply 3 or the auxiliary power supply 4, the print mode control unit 323 determines whether the BTON signal detected by the detection unit 206 is at Low level (Step S202). If so (Yes at Step S202), the print mode control unit 323 determines that the power supply source is the auxiliary power supply 4, and sets the print speed to that of the second low-speed mode (Step S203).

Then, the print mode control unit 323 notifies a printer driver on the host PC 400 that the print speed has been set to that of the second low-speed mode, and displays the printer driver on a terminal screen of the host PC 400 (Step S204).

Then, the printer driver of, for example, a print control program on the host PC 400 converts the entire document data received from the application into print data of a format processable as data to be printed by the image forming apparatus 100, and sends the result to the image forming apparatus 100. The image forming apparatus 100 accepts the print data at the accepting unit 321 via the communication I/F 303 (Step S205). Thereafter, the print mode control unit 323 ends the process.

Referring back to Step S202, if the BTON signal is not at Low level (No at Step S202), the print mode control unit 323 determines that the power supply source is the main power supply 3, and sets the print speed to that of the second high-speed mode (Step S206). Then, the print mode control unit 323 notifies the printer driver on the host PC 400 that the print speed has been set to that of the second high-speed mode, and after displaying the printer driver on the terminal screen of the host PC 400 (Step S204), performs the process that follows.

By controlling the image forming apparatus 100 to perform the above-described process, the print mode control unit 323 performs the print mode control of controlling the print speed to that of the second low-speed mode allowing lower power consumption when the apparatus is driven by the auxiliary power supply 4, and thus can reduce the power consumption.

In this manner, when the power supply source detected by the detection unit 206 is the auxiliary power supply 4, the print mode control unit 323 of the present embodiment automatically sets the print speed to that of the second low-speed mode allowing lower power consumption. This can reduce the power consumption when the apparatus is driven by the auxiliary power supply 4.

As described above, the present embodiment can reduce the power consumption when the apparatus is driven by the auxiliary power supply 4. Because the power consumption can be reduced when the apparatus is driven by the auxiliary power supply 4, the duration of the auxiliary power supply 4 can be extended.

Second Embodiment

Figure 10:
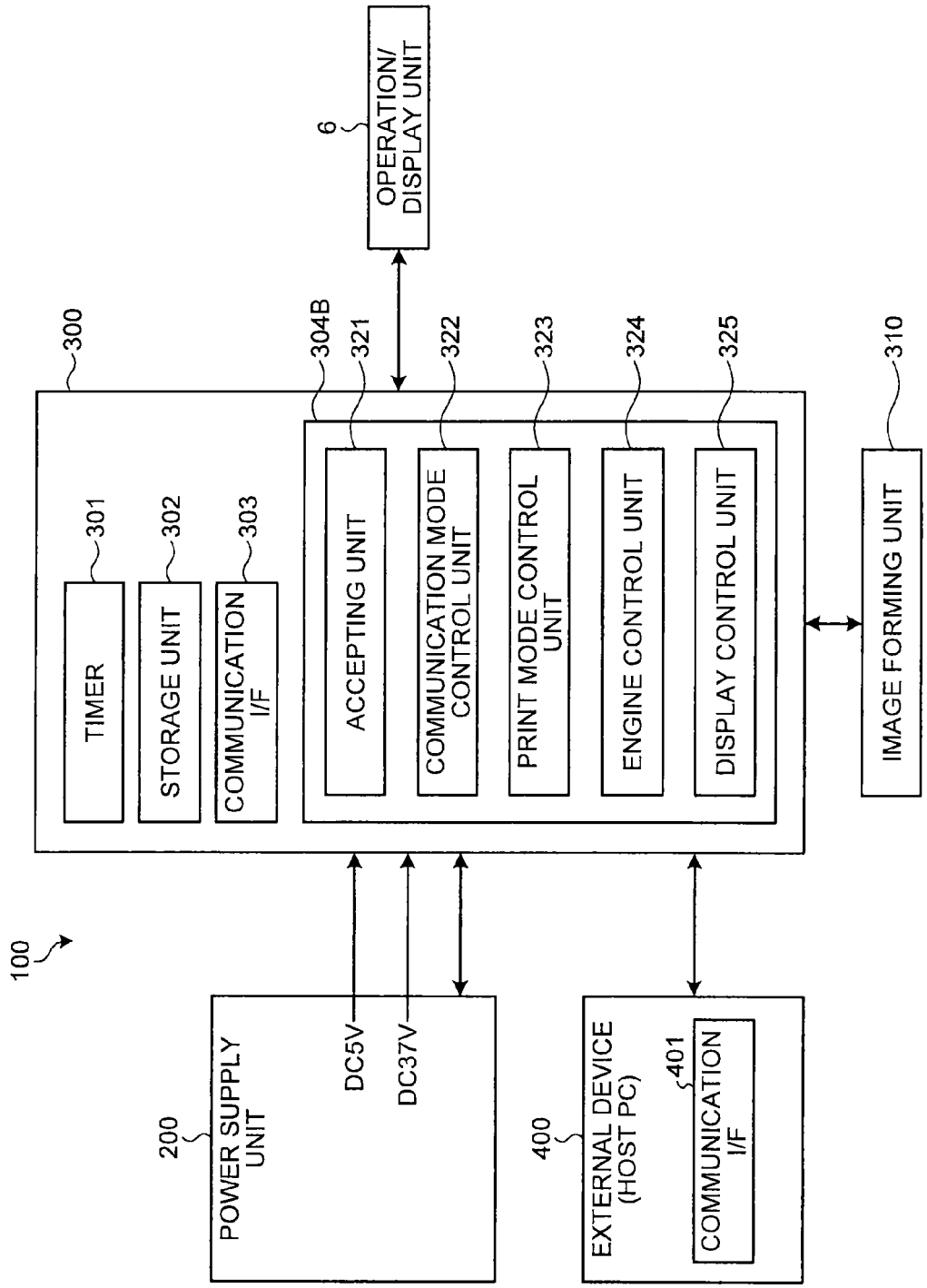
FIG. 10 is a block diagram explaining an overall configuration example of an image forming apparatus according to a second embodiment of the present invention.

A second embodiment will be described below. FIG. 10 is a block diagram explaining an overall configuration example of an image forming apparatus according to the present embodiment. The same reference numerals will be given to parts duplicating those of the above-described first embodiment illustrated in FIG. 4, and detailed description thereof will be omitted as appropriate. As illustrated in FIG. 10, in the present embodiment, a control unit 304B includes, in addition to the control unit 304A of the first embodiment, a display control unit 325 that controls the operation of the operation/display unit 6 of the image forming apparatus 100. The display control unit 325 controls the operation of the operation/display unit 6 of the image forming apparatus 100.

Specifically, when the detection unit 206 detects that the power supply source is the auxiliary power supply 4, the display control unit 325 performs control of turning off a backlight of the operation/display unit 6. When the detection unit 206 detects that the power supply source is the auxiliary power supply 4, the display control unit 325 performs control of changing the luminance of the backlight in accordance with the voltage of the auxiliary power supply 4 detected by the charge/discharge controller 201. The specific details will be described below. Detailed description will be omitted as appropriate for parts duplicating those of the above-described first embodiment.

Figure 11:
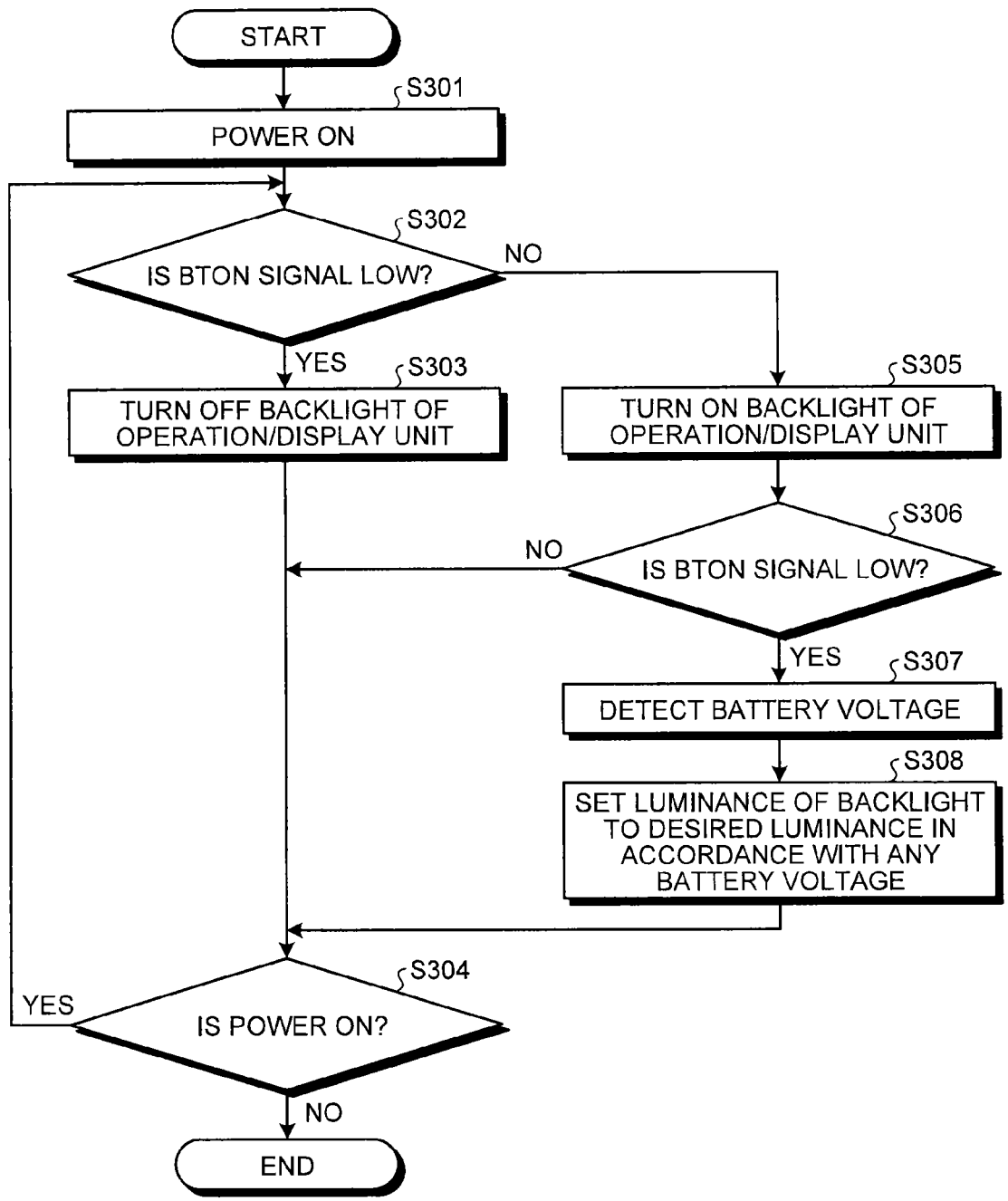
FIG. 11 is a flowchart illustrating an example of a procedure for a control operation of a display control unit of the image forming apparatus according to the second embodiment.

A description will be made of a control operation example of the display control unit 325 performed in the image forming apparatus 100 of the present embodiment. FIG. 11 is a flowchart illustrating an example of a procedure for the control operation of the display control unit in the image forming apparatus of the present embodiment. Specifically, FIG. 11 is a flowchart illustrating an example of the procedure when the display control unit controls the operation of the backlight of the operation/display unit in accordance with the power supply source.

As illustrated in FIG. 11, when the power of the image forming apparatus 100 has been turned on (Step S301), the display control unit 325 determines whether the BTON signal detected by the detection unit 206 is at Low level (Step S302) to determine whether the power supply source of the image forming apparatus 100 is the main power supply 3 or the auxiliary power supply 4.

If the BTON signal is at Low level (Yes at Step S302), the display control unit 325 determines that the power supply source is the auxiliary power supply 4, and performs the control of turning off the backlight of the operation/display unit 6 (Step S303).

Then, the display control unit 325 determined whether the power of the image forming apparatus 100 is on (Step S304). If so (Yes at Step S304), the display control unit 325 returns the process to Step S302, and repeats the process. If not (No at Step S304), the display control unit 325 ends the process.

Referring back to Step S302, if the BTON signal is not at Low level (No at Step S302), the display control unit 325 determines that the power supply source is the main power supply 3, and performs control of turning on the backlight of the operation/display unit 6 (Step S305).

Then, the display control unit 325 determines whether the BTON signal detected by the detection unit 206 is at Low level (Step S306). If not (No at Step S306), the display control unit 325 advances the process to Step S304, and repeats the process.

At Step S306, if the BTON signal is at Low level (Yes at Step S306), the display control unit 325 determines that the power supply source is the auxiliary power supply 4, and detects the voltage of the auxiliary power supply (battery) 4 with the charge/discharge controller 201 (Step S307). Then, the display control unit 325 performs control of setting the luminance of the backlight to a desired luminance in accordance with the voltage level of the battery 4 detected by the charge/discharge controller 201 (Step S308). Then, the display control unit 325 advances the process to Step S304, and repeats the process.

A description will be made of an example in which the display control unit 325 sets the luminance of the backlight to a desired luminance in accordance with the voltage level of the battery 4 detected by the charge/discharge controller 201. FIG. 12 is a diagram explaining the control operation example of the display control unit carried out in the image forming apparatus of the present embodiment. Specifically, FIG. 12 is a diagram illustrating an example in which the display control unit controls the luminance of the backlight in accordance with the voltage of the battery.

As illustrated in FIG. 12, in accordance with the voltage level of the battery 4 detected by the charge/discharge controller 201, the display control unit 325 performs control of setting the luminance of the backlight, for example, to 2000 $cd/m^2$ if the voltage of the battery 4 is 15.5 V or more. If the voltage of the battery 4 is not less than 14.8 V and less than 15.5 V, the display control unit 325 performs control of setting the luminance of the backlight to 1800 $cd/m^2$. If the voltage of the battery 4 is not less than 13.8 V and less than 14.8 V, the display control unit 325 performs control of setting the luminance of the backlight to 1600 $cd/m^2$. If the voltage of the battery 4 is not less than 13.2 V and less than 13.8 V, the display control unit 325 performs control of setting the luminance of the backlight to 1400 $cd/m^2$. If the voltage of the battery 4 is not less than 12.6 V and less than 13.2 V, the display control unit 325 performs control of setting the luminance of the backlight to 1200 $cd/m^2$. If the voltage of the battery 4 is less than 12.6 V, the display control unit 325 performs control of setting the luminance of the backlight to 1000 $cd/m^2$.

In this manner, the display control unit 325 can reduce the power consumption by reducing the backlight luminance as the voltage of the battery 4 drops.

FIG. 12 illustrates merely an example of the relation between the voltage of the battery 4 and the backlight luminance set by the display control unit 325. The present embodiment is not limited to this, and the respective values can optionally be set.

By performing the above-described process, the image forming apparatus 100 can reduce the power consumption when the apparatus is driven by the auxiliary power supply 4, and can extend the duration of the auxiliary power supply 4.

In this manner, when the power supply source is the auxiliary power supply 4, the display control unit 325 performs the control of turning off the backlight of the operation/display unit 6. As a result, the display control unit 325 does not turn on the backlight when the apparatus is driven by the auxiliary power supply 4, and thereby can reduce the power consumption, thus allowing the power consumption to be reduced when the apparatus is driven by the auxiliary power supply 4.

When the power supply source is the auxiliary power supply 4, the display control unit 325 also changes the luminance of the backlight of the operation/display unit 6 so as to decrease as the voltage of the auxiliary power supply 4 drops, and thereby can reduce the power consumption when the apparatus is driven by the auxiliary power supply 4.

As described above, when the apparatus is driven by the auxiliary power supply 4, the present embodiment can reduce the power consumption, and can extend the duration of the auxiliary power supply 4.

Modification of Second Embodiment

A modification of the second embodiment will be described below. In the present modification, the display control unit 325 of the control unit 304B illustrated in FIG. 10 controls the operation/display unit 6 of the image forming apparatus 100 in terms of display of information.

Specifically, when the power supply source detected by the detection unit 206 is the auxiliary power supply 4, the display control unit 325 controls the operation/display unit 6 to stop displaying information. When the detection unit 206 detects that the power supply source is the auxiliary power supply 4, the display control unit 325 also controls the operation/display unit 6 to display information in accordance with the voltage of the auxiliary power supply 4 detected by the charge/discharge controller 201. When the detection unit 206 detects that the power supply source is the auxiliary power supply 4, the display control unit 325 further controls the operation/display unit 6 to display information with blinking in accordance with the voltage of the auxiliary power supply 4 detected by the charge/discharge controller 201. The specific details will be described below. Detailed description will be omitted as appropriate for parts duplicating those of the first or the second embodiment described above.

Figure 13:
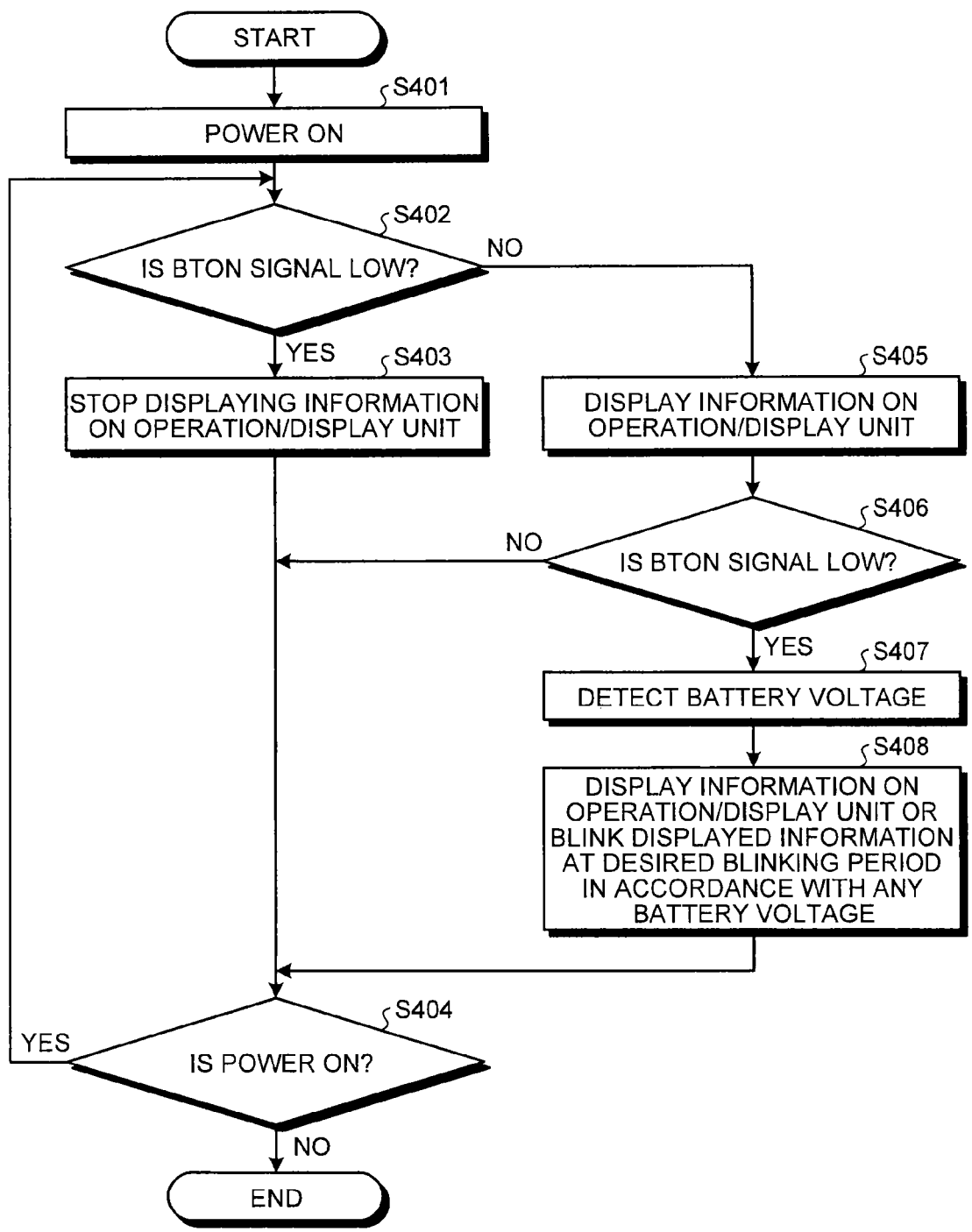
FIG. 13 is a flowchart illustrating an example of a procedure for a control operation of a display control unit of an image forming apparatus according to a modification of the second embodiment.

A description will be made of a control operation example of the display control unit 325 performed in the image forming apparatus 100 of the present modification. FIG. 13 is a flowchart illustrating an example of a procedure for the control operation of the display control unit in the image forming apparatus of the present modification. Specifically, FIG. 13 is a flowchart illustrating an example of the procedure when the display control unit controls the display operation of the operation/display unit in accordance with the power supply source.

As illustrated in FIG. 13, when the power of the image forming apparatus 100 has been turned on (Step S401), the display control unit 325 determines whether the BTON signal detected by the detection unit 206 is at Low level (Step S402) to determine whether the power supply source of the image forming apparatus 100 is the main power supply 3 or the auxiliary power supply 4.

If the BTON signal is at Low level (Yes at Step S402), the display control unit 325 determines that the power supply source is the auxiliary power supply 4, and controls the operation/display unit 6 to stop displaying information (Step S403).

Then, the display control unit 325 determines whether the power of the image forming apparatus 100 is on (Step S404). If so (Yes at Step S404), the display control unit 325 returns the process to Step S402, and repeats the process. If not (No at Step S404), the display control unit 325 ends the process.

Referring back to Step S402, if the BTON signal is not at Low level (No at Step S402), the display control unit 325 determines that the power supply source is the main power supply 3, and controls the operation/display unit 6 to display information (Step S405).

Then, the display control unit 325 determines whether the BTON signal detected by the detection unit 206 is at Low level (Step S406). If not (No at Step S406), the display control unit 325 advances the process to Step S404, and repeats the process.

At Step S406, if the BTON signal is at Low level (Yes at Step S406), the display control unit 325 determines that the power supply source is the auxiliary power supply 4, and detects the voltage of the auxiliary power supply (battery) 4 with the charge/discharge controller 201 (Step S407).

Then, the display control unit 325 controls the operation/display unit 6 to display information, or to blink the displayed information at a desired blinking period, in accordance with the voltage level of the battery 4 detected by the charge/discharge controller 201 (Step S408). Then, the display control unit 325 advances the process to Step S404, and repeats the process.

A description will be made of an example in which the display control unit 325 controls the operation/display unit 6 in terms of display of information in accordance with the voltage level of the battery 4 detected by the charge/discharge controller 201. FIG. 14 is a diagram explaining the control operation example of the display control unit carried out in the image forming apparatus of the present modification. Specifically, FIG. 14 is a diagram illustrating an example in which the display control unit controls the operation/display unit in terms of the display of information in accordance with the voltage the battery 4.

As illustrated in FIG. 14, in accordance with the voltage level of the battery 4 detected by the charge/discharge controller 201, the display control unit 325 controls the operation/display unit 6 to display information, for example, if the voltage of the battery 4 is 15.5 V or more. If the voltage of the battery 4 is not less than 14.8 V and less than 15.5 V, the display control unit 325 performs control of setting the frequency of blinking display of information to 1 Hz. If the voltage of the battery 4 is not less than 13.8 V and less than 14.8 V, the display control unit 325 performs control of setting the frequency of blinking display of information to 0.5 Hz. If the voltage of the battery 4 is not less than 13.2 V and less than 13.8 V, the display control unit 325 performs control of setting the frequency of blinking display of information to 0.33 Hz. If the voltage of the battery 4 is not less than 12.6 V and less than 13.2 V, the display control unit 325 performs control of setting the frequency of blinking display of information to 0.25 Hz. If the voltage of the battery 4 is less than 12.6 V, the display control unit 325 performs control of setting the frequency of blinking display of information to 0.2 Hz.

In this manner, the display control unit 325 can reduce the power consumption by controlling the operation/display unit 6 to change the blinking period of the blinking display of information shorter as the voltage of the battery 4 drops.

FIG. 14 illustrates merely an example of the relation between the voltage of the battery 4 and the display of information on the operation/display unit 6 set by the display control unit 325. The present modification is not limited to this, and the respective values can optionally be set.

By performing the above-described process, the image forming apparatus 100 can reduce the power consumption when the apparatus is driven by the auxiliary power supply 4, and can extend the duration of the auxiliary power supply 4.

In this manner, when the power supply source is the auxiliary power supply 4, the display control unit 325 controls the operation/display unit 6 to stop displaying information. As a result, the display control unit 325 controls the operation/display unit 6 to stop displaying information when the apparatus is driven by the auxiliary power supply 4, and thereby can reduce the power consumption, thus allowing the power consumption to be reduced when the apparatus is driven by the auxiliary power supply 4.

When the power supply source is the auxiliary power supply 4, the display control unit 325 controls the operation/display unit 6 to display information, or to display the information with blinking in accordance with the voltage of the auxiliary power supply 4, and thereby can reduce the power consumption when the apparatus is driven by the auxiliary power supply 4.

As described above, when the apparatus is driven by the auxiliary power supply 4, the present modification can reduce the power consumption, and can extend the duration of the auxiliary power supply 4.

Modification of First and Second Embodiments

A modification of the first and the second embodiments will be described below. In the present modification, the accepting unit 321 of the control units 304A and 304B of the above-described first and second embodiments illustrated in FIGS. 4 and 10 has a function of accepting the setting of the data transfer rate of the image forming apparatus 100, the setting of the print speed, the setting for the backlight, and the setting for the information display on the operation/display unit 6. The accepting unit 321 accepts the settings for the various operational states of the image forming apparatus 100, and transfers the various settings to the control unit 304A or 304B. In cooperation with any of the communication mode control unit 322, the print mode control unit 323, and the display control unit 325, depending on the accepted various settings, the control unit 304A or 304B performs control according to the various settings. The specific details will be described below. Detailed description will be omitted as appropriate for parts duplicating those of the first or the second embodiment described above.

FIGS. 15A to 15D are examples of display on the operation/display unit carried out by the accepting unit in the image forming apparatus of the modification. Specifically, FIGS. 15A to 15D are schematic diagrams illustrating examples of display of an accepting screen for the user to change the various settings by operating the display panel or the operation keys of the operation/display unit of the image forming apparatus. The user displays these accepting screens of the operation/display unit 6 by selecting the various settings through operation of the display panel or the operation keys of the operation/display unit 6.

Figure 15A:
FIG. 15A is a diagram illustrating an example of display on an operation/display unit carried out by an accepting unit in an image forming apparatus according to a modification of the first and the second embodiments.

As illustrated in FIG. 15A, the accepting unit 321 performs display on the operation/display unit 6 of the image forming apparatus 100 to accept a selection from the user on whether the data transfer rate is to be automatically set to that of the first low-speed mode in the communication mode control unit 322 when the apparatus is driven by the auxiliary power supply 4. If ON is selected from the display panel of the operation/display unit 6, the accepting unit 321 transfers the accepted setting to the communication mode control unit 322 of the control unit 304A. Under the control of the control unit 304A, the communication mode control unit 322 performs control of automatically setting the data transfer rate to that of the first low-speed mode. If OFF is selected from the display panel of the operation/display unit 6, the accepting unit 321 transfers the accepted setting to the communication mode control unit 322 of the control unit 304A. Under the control of the control unit 304A, the communication mode control unit 322 does not perform the control of automatically setting the data transfer rate to that of the first low-speed mode. In other words, the data transfer rate is set to that of the first high-speed mode. According to the initial setting, the data transfer rate is automatically set to that of the first low-speed mode when the apparatus is driven by the auxiliary power supply 4.

Figure 15B:
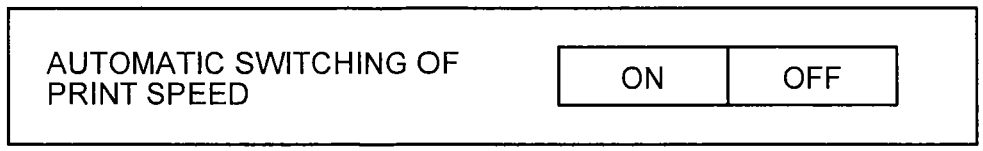
FIG. 15B is a diagram illustrating an example of the display on the operation/display unit carried out by the accepting unit in the image forming apparatus according to the modification of the first and the second embodiments.

As illustrated in FIG. 15B, the accepting unit 321 performs display on the operation/display unit 6 of the image forming apparatus 100 to accept a selection from the user on whether the print speed is to be automatically set to that of the second low-speed mode in the print mode control unit 323 when the apparatus is driven by the auxiliary power supply 4. If ON is selected from the display panel of the operation/display unit 6, the accepting unit 321 transfers the accepted setting to the print mode control unit 323 of the control unit 304A. Under the control of the control unit 304A, the print mode control unit 323 performs control of automatically setting the print speed to that of the second low-speed mode. If OFF is selected from the display panel of the operation/display unit 6, the accepting unit 321 transfers the accepted setting to the print mode control unit 323 of the control unit 304A. Under the control of the control unit 304A, the print mode control unit 323 does not perform the control of automatically setting the print speed to that of the second low-speed mode. In other words, the print speed is set to that of the second high-speed mode. According to the initial setting, the print speed is automatically set to that of the second low-speed mode when the apparatus is driven by the auxiliary power supply 4.

Figure 15C:
FIG. 15C is a diagram illustrating an example of the display on the operation/display unit carried out by the accepting unit in the image forming apparatus according to the modification of the first and the second embodiments.

As illustrated in FIG. 15C, the accepting unit 321 performs display on the operation/display unit 6 of the image forming apparatus 100 to accept a selection from the user on whether the backlight of the operation/display unit 6 is to be turned off when the apparatus is driven by the auxiliary power supply 4. If ON is selected from the display panel of the operation/display unit 6, the accepting unit 321 transfers the accepted setting to the display control unit 325 of the control unit 304B. Under the control of the control unit 304B, the display control unit 325 performs control of automatically turning off the backlight. If OFF is selected from the display panel of the operation/display unit 6, the accepting unit 321 transfers the accepted setting to the display control unit 325 of the control unit 304B. Under the control of the control unit 304B, the display control unit 325 performs control of not automatically turning off the backlight. In other words, the backlight is set to be kept on. According to the initial setting, the backlight of the operation/display unit 6 is set to be automatically turned off when the apparatus is driven by the auxiliary power supply 4.

Figure 15D:
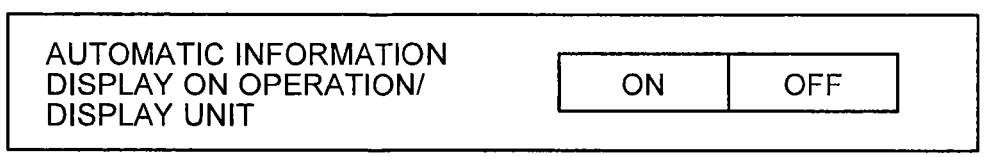
FIG. 15D is a diagram illustrating an example of the display on the operation/display unit carried out by the accepting unit in the image forming apparatus according to the modification of the first and the second embodiments.

As illustrated in FIG. 15D, the accepting unit 321 performs display on the operation/display unit 6 of the image forming apparatus 100 to accept a selection from the user on whether information is to be displayed on the operation/display unit 6 when the apparatus is driven by the auxiliary power supply 4. If ON is selected from the display panel of the operation/display unit 6, the accepting unit 321 transfers the accepted setting to the display control unit 325 of the control unit 304B. Under the control of the control unit 304B, the display control unit 325 performs control of automatically displaying information on the operation/display unit 6. If OFF is selected from the display panel of the operation/display unit 6, the accepting unit 321 transfers the accepted setting to the display control unit 325 of the control unit 304B. Under the control of the control unit 304B, the display control unit 325 performs control of not displaying information on the operation/display unit 6. According to the initial setting, the operation/display unit 6 is set to display no information when the apparatus is driven by the auxiliary power supply 4.

In this manner, the accepting unit 321 can accept optional settings from the user for respective operations of the image forming apparatus 100. This allows the image forming apparatus 100 to give a higher priority to the reduction in the power consumption when the apparatus is driven by the auxiliary power supply 4, and also to adapt to various ways of use by the user.

The settings for respective operations of the image forming apparatus 100 are not limited to those described above for the data transfer rate, the print speed, the backlight, and the display of information on the operation/display unit 6. The accepting unit 321 can accept various settings for optional operations. While the example has been given in which the accepting unit 321 accepts the settings entered from the operation/display unit (display panel) 6 of the image forming apparatus 100, the method of accepting the settings is not limited to this. The input may be accepted, for example, from the printer driver displayed on the terminal screen of the host PC 400 described above.

As described above, the present modification enables acceptance of optional settings from the user for respective operations of the image forming apparatus 100, and thereby allows the user to use the image forming apparatus 100 in accordance with use environments.

As described above, according to the present modification, the communication mode control unit 322 automatically sets the data transfer rate to that of the first low-speed mode allowing lower power consumption when the apparatus is driven by the auxiliary power supply 4. This can reduce the power consumption when the apparatus is driven by the auxiliary power supply 4, and thereby can extend the duration of the auxiliary power supply 4.

When the apparatus is driven by the auxiliary power supply 4, the print mode control unit 323 automatically sets the print speed to that of the second low-speed mode allowing lower power consumption. This can reduce the power consumption when the apparatus is driven by the auxiliary power supply 4.

The control program that implements the communication mode control unit 322 and the print mode control unit 323 of either of the embodiments may be provided by being recorded as a file in an installable format or an executable format in a computer-readable storage medium, such as a CD-ROM, a flexible disk (FD), a CD-R, or a digital versatile disc (DVD).

The control program that implements the communication mode control unit 322 and the print mode control unit 323 of either of the embodiments may also be provided by being stored on a computer connected to a network such as the Internet, and downloaded via the network. The control program that implements the communication mode control unit 322 and the print mode control unit 323 of either of the embodiments may also be provided or delivered via a network such as the Internet.

According to the embodiments, it is possible to reduce the power consumption when an image forming apparatus is driven by an auxiliary power supply.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image forming apparatus comprising:
a main power supply;
an auxiliary power supply that stores therein power from the main power supply, and that supplies the stored power; and
circuitry configured to:
detect an amount of charge of the auxiliary power supply and control charge of the power from the main power supply to the auxiliary power supply, independent of a state of the image forming apparatus when the power is supplied from the main power supply to the image forming apparatus;
perform control of switching a power supply source to the auxiliary power supply when the main power supply is off, and perform control of switching the power supply source to the main power supply when the main power supply is on;
detect whether the power supply source is the main power supply or the auxiliary power supply;
perform control of switching a data transfer rate from that of a first high-speed mode to that of a first low-speed mode which allows power consumption lower than that of the first high-speed mode when the auxiliary power supply is detected as the power supply source, the data transfer rate being of data exchanged between the image forming apparatus and an external device;
perform control of switching a print speed from that of a second high-speed mode to that of a second low-speed mode which allows the power consumption lower than that of the second high-speed mode when the auxiliary power supply is detected as the power supply source;
notify a printer driver in the external device when the print speed is switched to the second low-speed mode or the second high-speed mode; and
control a display of the printer driver on the external device.

2. The image forming apparatus according to claim 1, wherein the circuitry is further configured to:
control an operation of an operation/display device, and
turn off a backlight of the operation/display device when the auxiliary power supply is detected as the power supply source.

3. The image forming apparatus according to claim 1, wherein the circuitry is further configured to:
control an operation of an operation/display device, and
stop a display of information on the operation/display device when the auxiliary power supply is detected as the power supply source.

4. The image forming apparatus according to claim 1, wherein the circuitry is further configured to:
control an operation of an operation/display device, and
change a luminance of a backlight of the operation/display device in accordance with a voltage of the auxiliary power supply when the auxiliary power supply is detected as the power supply source.

5. The image forming apparatus according to claim 1, wherein the circuitry is further configured to:
control an operation of an operation/display device, and
control a display of information on the operation/display device in accordance with a voltage of the auxiliary power supply when the auxiliary power supply is detected as the power supply source.

6. The image forming apparatus according to claim 1, wherein the circuitry is further configured to:
control an operation of an operation/display device, and
control a display of information that blinks on the operation/display device in accordance with a voltage of the auxiliary power supply when the auxiliary power supply is detected as the power supply source.

7. The image forming apparatus according to claim 1, wherein the circuitry is further configured to:
accept a setting for whether to switch the data transfer rate to that of the first low-speed mode, a setting for whether to switch the print speed to that of the second low-speed mode, a setting for whether to turn off a backlight of an operation/display device, and a setting for whether to stop a display of information on the operation/display device.

8. A power supply control method performed in an image forming apparatus that includes a main power supply, and an auxiliary power supply that stores therein power from the main power supply, and that supplies the stored power, the power supply control method comprising:
detecting an amount of charge of the auxiliary power supply and controlling charge of the power from the main power supply to the auxiliary power supply, independent of a state of the image forming apparatus when the power is supplied from the main power supply to the image forming apparatus;
performing control of switching a power supply source to the auxiliary power supply when the main power supply is off, and performing control of switching the power supply source to the main power supply when the main power supply is on;
detecting whether the power supply source is the main power supply or the auxiliary power supply;
performing control of switching a data transfer rate from that of a first high-speed mode to that of a first low-speed mode which allows power consumption lower than that of the first high-speed mode when the auxiliary power supply is detected as the power supply source, the data transfer rate being of data exchanged between the image forming apparatus and an external device;
performing control of switching a print speed from that of a second high-speed mode to that of a second low-speed mode which allows the power consumption lower than that of the second high-speed mode when the auxiliary power supply is detected as the power supply source;
notifying a printer driver in the external device when the print speed is switched to the second low-speed mode or the second high-speed mode; and
controlling a display of the printer driver on the external device.

* * * * *